(12) United States Patent
Tanaka et al.

(10) Patent No.: US 8,129,062 B2
(45) Date of Patent: Mar. 6, 2012

(54) FUEL CELL SYSTEM OPERATION METHOD

(75) Inventors: Yoshikazu Tanaka, Kyoto (JP); Terumaru Harada, Ikoma (JP); Shinji Miyauchi, Shiki-gun (JP); Tetsuya Ueda, Kasugai (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/819,519

(22) Filed: Jun. 21, 2010

(65) Prior Publication Data

US 2010/0255390 A1 Oct. 7, 2010

Related U.S. Application Data

(63) Continuation of application No. 10/414,143, filed on Apr. 14, 2003, now abandoned.

(30) Foreign Application Priority Data

Apr. 15, 2002 (JP) .................................. 2002-111687

(51) Int. Cl.
*H01M 8/04* (2006.01)

(52) U.S. Cl. ........ 429/442; 429/430; 429/433; 429/428; 429/440; 429/437

(58) Field of Classification Search .................. 429/442, 429/430, 433, 428, 440, 437
See application file for complete search history.

(56) References Cited

U.S. PATENT DOCUMENTS

| | | | |
|---|---|---|---|
| 6,045,933 A | 4/2000 | Okamoto | |
| 6,376,111 B1 | 4/2002 | Mathias et al. | |
| 6,656,620 B2 | 12/2003 | Katagiri et al. | |
| 6,713,204 B2 * | 3/2004 | Shimanuki et al. | 429/414 |
| 6,926,983 B2 | 8/2005 | Brambilla et al. | |
| 7,507,487 B2 | 3/2009 | Tajima et al. | |
| 2002/0192520 A1 * | 12/2002 | Nonobe | 429/23 |
| 2003/0099873 A1 * | 5/2003 | Brambilla et al. | 429/32 |

FOREIGN PATENT DOCUMENTS

| | | |
|---|---|---|
| EP | 1182720 A1 | 2/2002 |
| JP | 6-124722 A | 5/1994 |

(Continued)

OTHER PUBLICATIONS

Office Action Issued Sep. 22, 2006 in related U.S. Appl. No. 10/414,143.

(Continued)

*Primary Examiner* — Helen O Conley
(74) *Attorney, Agent, or Firm* — Panitch Schwarze Belisario & Nadel LLP

(57) ABSTRACT

A method of operating fuel cell system includes generating electricity by a fuel cell using fuel gas and oxidizing gas and allowing cooling water to flow in the fuel cell and thereby cooling the fuel cell. The method includes transferring moisture from exhaust gas to supply gas using a first humidifier, the exhaust gas being discharged from the fuel cell, the supply gas being supplied to the fuel cell, and transferring moisture from the cooling water to the supply gas humidified using a second humidifier. The method includes at least one of detecting humidity of the supply gas humidified, detecting temperature of the cooking water, detecting the flow rate of the supply gas and detecting the amount of electricity generated by the fuel cell. The method also includes controlling the humidity of the supply gas humidified based on the value detected.

6 Claims, 17 Drawing Sheets

FOREIGN PATENT DOCUMENTS

| | | |
|---|---|---|
| JP | 06132038 A | 5/1994 |
| JP | 06338338 A | 12/1994 |
| JP | 07288134 A | 10/1995 |
| JP | 9-007622 A | 1/1997 |
| JP | 2001-216984 A | 8/2001 |
| WO | 9905741 A1 | 2/1999 |
| WO | 01/71837 A1 | 9/2001 |

OTHER PUBLICATIONS

Office Action Issued Aug. 7, 2007 in related U.S. Appl. No. 10/414,143.

Office Action Issued Feb. 20, 2008 in related U.S. Appl. No. 10/414,143.

Office Action Issued Sep. 23, 2008 in related U.S. Appl. No. 10/414,143.

Office Action Issued May 21, 2009 in related U.S. Appl. No. 10/414,143.

Office Action Issued Jan. 22, 2010 in related U.S. Appl. No. 10/414,143.

European Search Report dated Jun. 11, 2007 in counterpart EP Application No. 03008589.8.

Office Action Issued Jan. 12, 2005 in counterpart KR Application No. 10-2003-0023450.

Office Action Issued Nov. 24, 2009 in counterpart JP Application No. 2003-108985.

Office Action Issued Aug. 18, 2009 in counterpart JP Application No. 2003-108985.

The Random House College Dictionary, 1980, Random House, Inc., Revised Edition, Section I, p. 692.

* cited by examiner

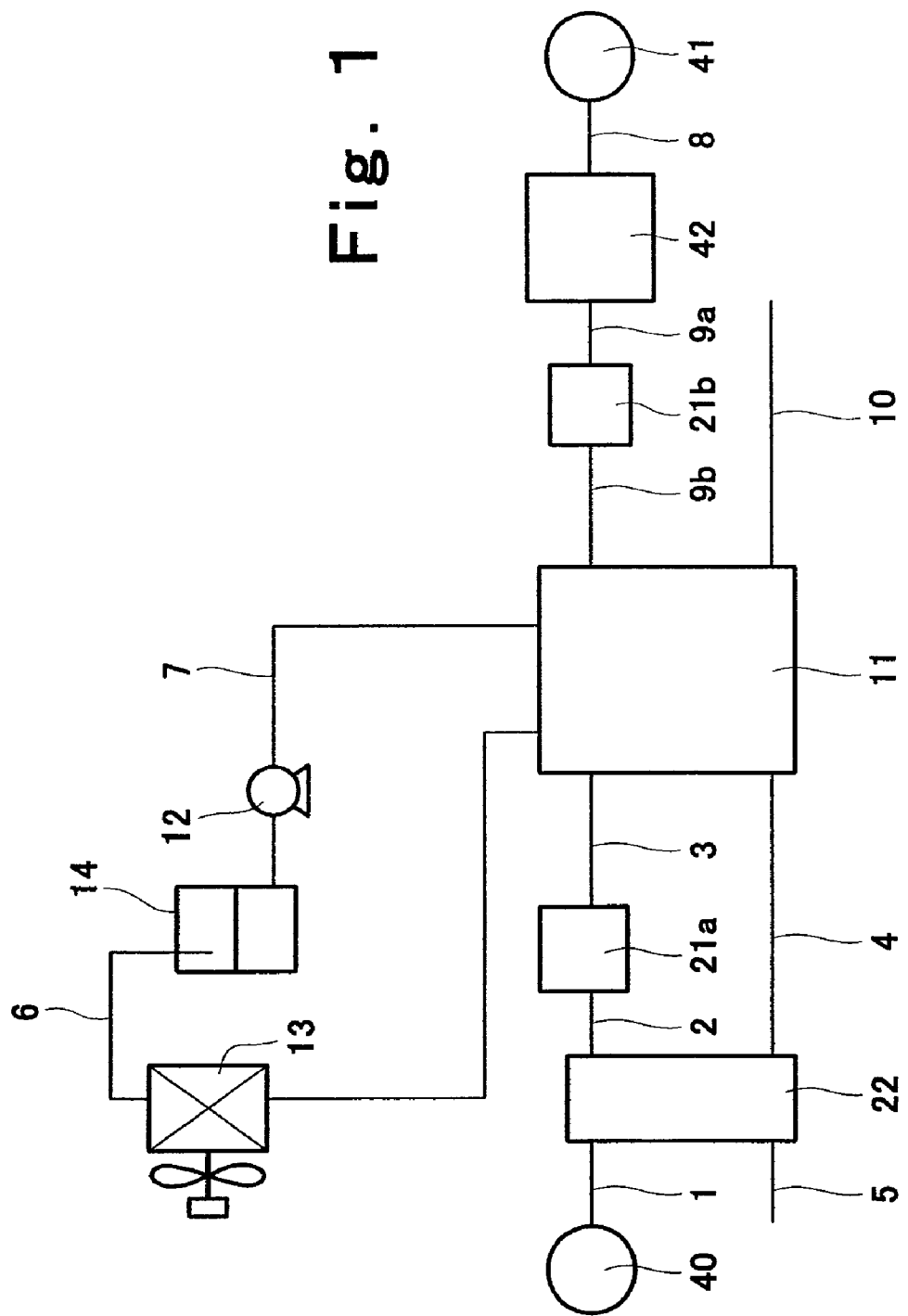

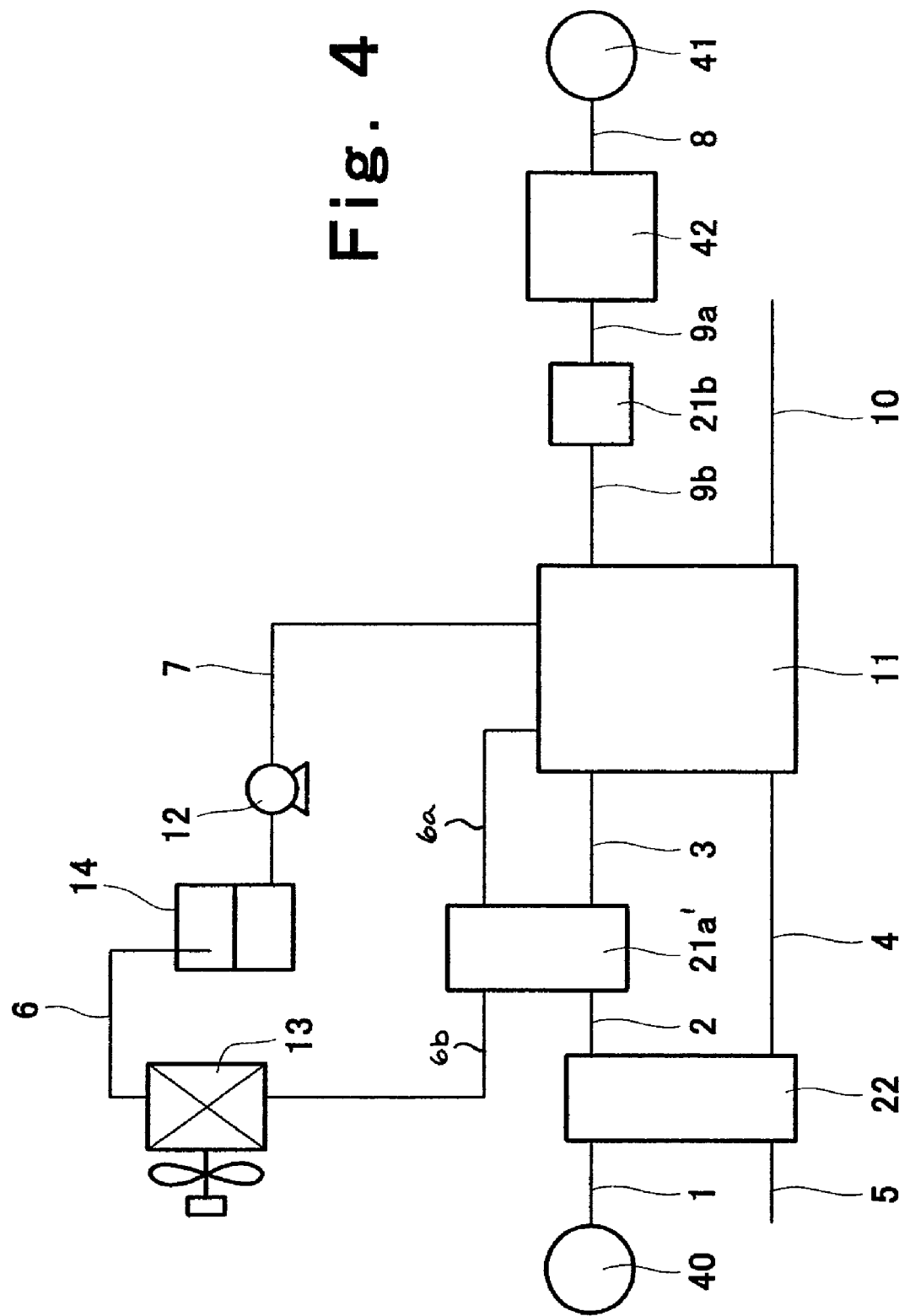

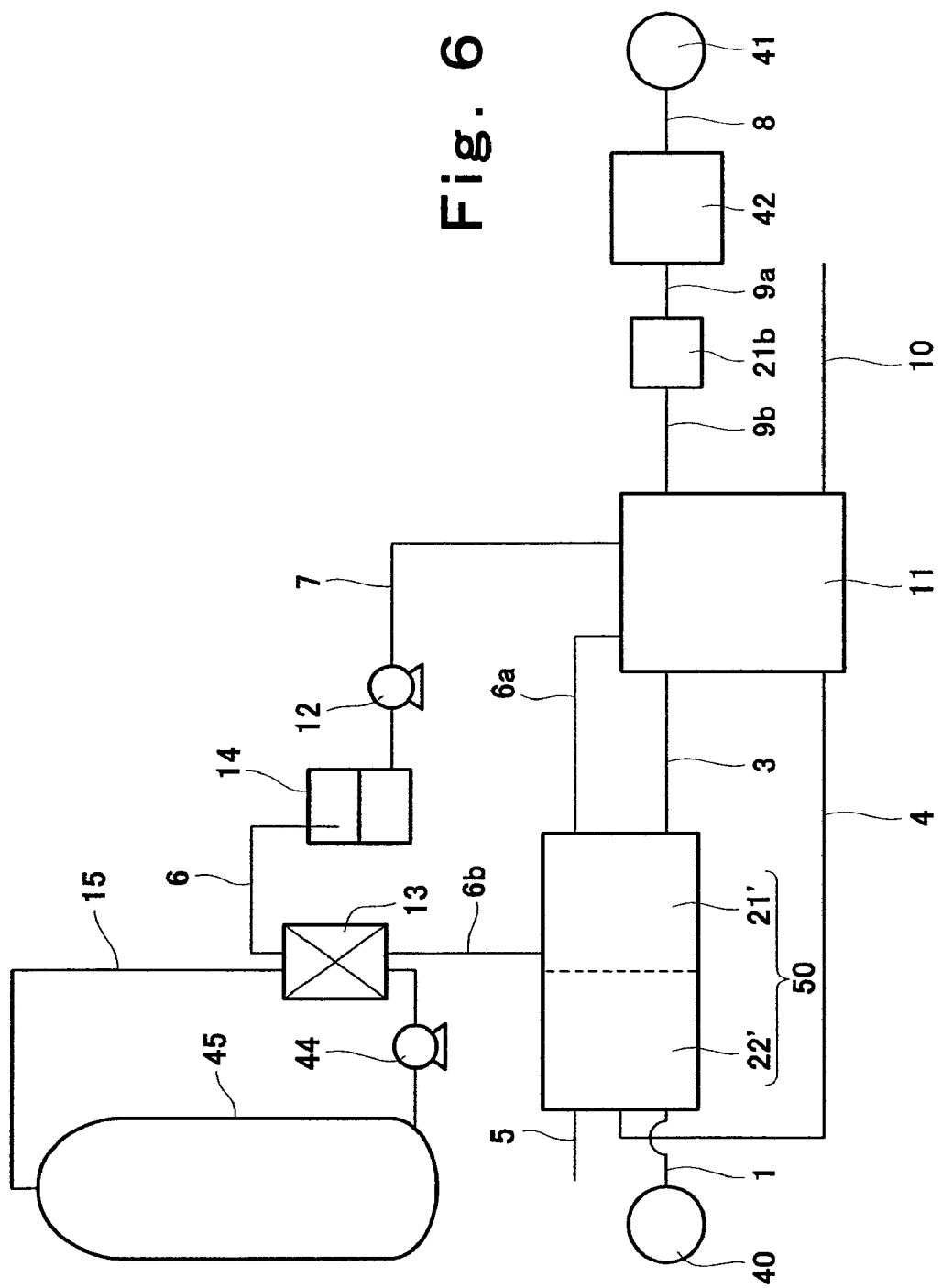

FUEL CELL SYSTEM OPERATION METHOD

CROSS-REFERENCE TO RELATED APPLICATIONS

The present application is a continuation of U.S. patent application Ser. No. 10/414,143, filed Apr. 14, 2003 and entitled "FUEL CELL SYSTEM," the disclosure of which is incorporated herein by reference.

BACKGROUND OF THE INVENTION

The present invention relates to a method of operating fuel cell system which uses a fuel cell for power generation and a supply of heat.

In a known fuel cell system, a hydrogen-rich gas supplied as fuel gas and air supplied as oxidizing gas are allowed to react to each other, thereby generating electricity and heat within the fuel cell. The fuel gas and oxidizing gas are supplied to the fuel cell after respectively humidified by a humidifying means. One example of the humidifying means for the fuel gas and oxidizing gas is a bubbler which performs humidification by letting the fuel gas and oxidizing gas pass through hot water heated by a heater (see Japanese Patent Publication Kokai No. 7-288134). This fuel cell system, however, suffers from a decline in energy efficiency because the bubbler consumes energy for heating water.

Another known humidifier is such that moisture (water vapor) contained in exhaust air (off gas) discharged from the air pole side of the fuel cell is transferred to air to be supplied to the air pole side of the fuel cell through a vapor transmitting film, thereby humidifying the supply air (see Japanese Patent Publication Kokai No. 6-132038). This humidifier is designed to carry out humidification by use of exhaust air of high temperature, thereby saving energy required for the humidification. This humidifier has revealed such a disadvantage that the gas to be humidified (which is, herein, the supply air to be humidified) cannot be humidified to a dew point temperature higher than that of the humidifying gas (which is, herein, the exhaust gas serving as a moisture supply source). In addition, if the gas is humidified to a high dew point temperature, vapor transmitting films having large film area become necessary, leading to an increase in the scale of the humidifier. Therefore, downsizing of the fuel cell system becomes difficult.

BRIEF SUMMARY OF THE INVENTION

The present invention has been directed to solving the problems presented by the prior art fuel cell systems described above. Therefore, a primary object of the invention is to provide a fuel cell system obtaining improved energy efficiency for the overall system by reducing the energy required for humidification of gas to be supplied to the fuel cell; having compact size; and performing stable system operation.

The above object can be accomplished by a fuel cell system comprising a fuel cell for generating electricity by use of fuel gas and oxidizing gas, a first humidifying portion and second humidifying portion which sequentially humidify at least one of supply fuel gas and supply oxidizing gas, the supply fuel gas being fuel gas to be supplied to the fuel cell, the supply oxidizing gas being oxidizing gas to be supplied to the fuel cell, wherein the first humidifying portion performs the humidification by use of moisture contained in at least one of exhaust fuel gas and exhaust oxidizing gas, the exhaust fuel gas being fuel gas discharged from the fuel cell, the exhaust oxidizing gas being oxidizing gas discharged from the fuel cell, and the second humidifying portion performs the humidification by use of hot water.

With this arrangement, the supply fuel gas or supply oxidizing gas, which has been pre-humidified in the first humidifying portion by use of the exhaust fuel gas or the exhaust oxidizing gas, further undergoes humidification carried out in the second humidifying portion by use of hot water. Thus, the energy (particularly, the heat energy) and moisture consumed by the humidification in the second humidifying portion can be reduced. In addition, the first humidifying portion carries out humidification making use of the exhaust fuel gas or exhaust oxidizing gas discharged from the fuel cell, the energy required for the humidification in the first humidifying portion can be reduced. Therefore, with the above arrangement, the energy efficiency of the overall fuel cell system can be improved. In addition, since the moisture required in the second humidifying portion can be reduced, the amount of the moisture supplied to the second humidifying portion can be reduced, so that the temperature change in the second humidifying portion can be restrained. Therefore, the humidity in the second humidifying portion can be made stable and the system operation can perform stably. Even if the supply fuel gas or supply oxidizing gas humidified to a high dew point temperature is supplied, stepwise humidification can be effectively performed by the first and second humidifying portions, so that the fuel cell system can be downsized.

The fuel cell system may further comprise a cooling system for allowing cooling water to flow in the fuel cell and said hot water may be the flowing cooling water.

With this arrangement, the supply fuel gas or supply oxidizing gas is heated by the second humidifying portion, utilizing the cooling water used for cooling the fuel cell and having a temperature of 70 to 75° C. Therefore, there is no need to heat water for the humidification in the second humidifying portion in like the case utilizing a bubbler or the like, and accordingly, the energy required for the humidification in the second humidifying portion can be reduced. Additionally, since the cooling water is maintained at a substantially stable temperature, stable, highly efficient humidification can be performed in the second humidifying portion. Furthermore, with this arrangement, since the supply fuel gas or supply oxidizing gas has been pre-humidified in the first humidifying portion, the amount of moisture consumed for the humidification in the second humidifying portion can be reduced, so that the amount of the cooling water consumed in the second humidifying portion can be reduced. Therefore, the amount of the moisture supplied with the cooling water system can be reduced. As a result, the humidity in the second humidifying portion and the temperature of the fuel cell can be made stable, so the system operation can perform stably.

The fuel cell system may further comprise a heat-storage portion for storing at least one of the heat which has been recovered from the fuel cell by the cooling water. For instance, the heat-storage portion may have a hot water reserve tank in which hot water heated by a heat exchange between the cooling water is stored.

This arrangement enables effective utilization of the heat recovered from the cooling water by the heat-storage portion, and therefore a further improvement in the energy efficiency of the fuel cell system can be achieved. Particularly, in this arrangement, the first humidifying portion is positioned in the upstream of the second humidifying portion, so that the heat and moisture deprived from the cooling water during the humidification in the second humidifying portion can be reduced. This makes it possible not only to recover a greater amount of heat from the cooling water but also to achieve the easy control of heat exchange between the cooling water and the water stored in the hot water reserve tank. Therefore, for example, in such a case that the heat-storage portion has the hot water reserve tank, it is possible to increase the temperature of the hot water stored in the hot water reserve tank by utilizing the recovered heat. Thus, the hot water of high temperature stored in the hot water reserve tank has a wide range of applications so that the usefulness of the recovered heat can be increased.

The first humidifying portion may have flow paths for at least one of the supply fuel gas and the supply oxidizing gas and flow paths for at least one of the exhaust fuel gas and the exhaust oxidizing gas, each supply gas flow path and each exhaust gas flow path being in contact with each other with a moisture transmitting film for selectively transmitting moisture being interposed therebetween. For instance, the first humidifying portion may be formed by laminating a plurality of flow path plates, each of the flow path plates having the flow path for at least one of the supply fuel gas and the supply oxidizing gas on a first main surface and the flow path for at least one of the exhaust fuel gas and the exhaust oxidizing gas on a second main surface, the plural flow path plates being laminated such that each supply gas flow path is in contact with each exhaust gas flow path with the moisture transmitting film interposed therebetween.

With this arrangement, the first humidifying portion can carry out, in one process and with a simple structure, recovery of the moisture of the exhaust fuel gas or exhaust oxidizing gas discharged from the fuel cell and addition of the moisture to the supply fuel gas or supply oxidizing gas. This leads to simplification of the system and reduction of cost.

The second humidifying portion may be formed such that each of the flow paths for at least one of the supply fuel gas and the supply oxidizing gas is in contact with each of paths for the cooling water with a moisture transmitting film for selectively transmitting moisture interposed therebetween. For instance, the second humidifying portion may be formed by laminating a plurality of flow path plates, each of the flow path plates having the flow path for at least one of the supply fuel gas and the supply oxidizing gas on a first main surface and the flow path for the cooling water on a second main surface, the plural flow path plates being laminated such that each supply gas flow path is in contact with each cooling water flow path with the moisture transmitting film interposed therebetween.

With this arrangement, in the second humidifying portion, the moisture of the cooling water can be transmitted to the supply fuel gas or supply oxidizing gas with a simple structure, utilizing the cooling water. This leads not only to an improvement in the energy efficiency of the system but also to simplification of the system and reduction of cost.

The fuel cell system may have a humidifying unit wherein the first humidifying portion is adjacent to and integral with the second humidifying portion. For instance, the humidifying unit may be formed by laminating the plural flow path plates with the moisture transmitting film for selectively transmitting moisture being interposed between every two plates, each flow path plate having, on a first main surface, the flow path for at least one of the exhaust fuel gas and the exhaust oxidizing gas in the region of the first humidifying portion and the flow path for the cooling water in the region of the second humidifying portion and having, on a second main surface, the flow path for at least one of the supply fuel gas and the supply oxidizing gas, the supply gas flow path continuously extending throughout the first and second humidifying portions. Alternatively, the first humidifying portion of the humidifying unit may be formed by laminating a plurality of first flow path plates with the moisture transmitting film for selectively transmitting moisture interposed between every two plates, each first flow path plate having the flow path for at least one of the exhaust fuel gas and the exhaust oxidizing gas on a first main surface and the flow path for at least one of the supply fuel gas and the supply oxidizing gas on a second main surface, whereas the second humidifying portion of the humidifying unit may be formed by laminating a plurality of second flow path plates with the moisture transmitting film for selectively transmitting moisture interposed between every two plates, each second flow path plate having the flow path for the cooling water on a first main surface and the flow path for at least one of the supply fuel gas and the supply oxidizing gas on a second main surface, and the first and second humidifying portions are laminated to constitute the humidifying unit.

With this arrangement, the supply fuel gas or the supply oxidizing gas may be fed from the first humidifying portion to the second humidifying portion without use of a pipeline. This brings about not only a reduction in the size and cost of the fuel cell system but also prevention of energy loss in the pipelines etc., which leads to improved energy efficiency.

The humidifying unit may be adjacent to and integral with the fuel cell, or alternatively, the second humidifying portion may be adjacent to and integral with the fuel cell.

With such an arrangement, the supply fuel gas or the supply oxidizing gas can be supplied from the humidifying unit to the fuel cell or from the second humidifying portion to the fuel cell without use of a pipeline. This brings about not only a reduction in the size and cost of the fuel cell system but also prevention of energy loss in the pipelines etc., which leads to improved energy efficiency. Particularly, since the need for a pipeline between the second humidifying portion and the fuel cell is obviated, the moisture of condensed dew caused by heat dissipation in the pipeline is prevented from entering the fuel cell. As a result, the fuel cell system can be more stably operated.

The fuel cell system may further comprise a humidity detector for detecting the humidity of at least one of the supply fuel gas and the supply oxidizing gas to be supplied from the second humidifying portion to the fuel cell and a control unit for controlling the humidity of the supply gas based on the humidity of the supply gas which has been detected by the humidity detector. The control unit may control the humidity of the supply gas by controlling the temperature or flow rate of the cooling water to be supplied to the second humidifying portion. Alternatively, the cooling system may have a cooling water path for allowing the cooling water to flow to the second humidifying portion and a cooling water bypass path connected to the cooling water path for bypassing the second humidifying portion, while the control unit controls the humidity of the supply gas by controlling the flow rate of the cooling water to be supplied to the second humidifying portion through the cooling water path and the flow rate of the cooling water to be supplied to the cooling water bypass path.

The fuel cell system may further comprise a cooling water temperature detector for detecting the temperature of the cooling water to be supplied to the second humidifying portion and a control unit for controlling the humidity of at least one of the supply fuel gas and the supply oxidizing gas based on the temperature of the cooling water which has been detected by the cooling water temperature detector. The control unit may control the temperature or flow rate of the cooling water to be supplied to the second humidifying portion. Alternatively, the cooling system may have a cooling water path for allowing the cooling water to flow to the second humidifying portion and a cooling water bypass path connected to the cooling water path for bypassing the second humidifying portion, while the control unit may control the humidity of the supply gas by controlling the flow rate of the cooling water to be supplied to the second humidifying portion through the cooling water path and the flow rate of the cooling water to be supplied to the cooling water bypass path.

The fuel cell system may further comprise a gas flow rate detector for detecting the flow rate of at least one of the supply fuel gas and the supply oxidizing gas to be supplied to the fuel cell and a control unit for controlling the humidity of the supply gas based on the flow rate of the supply gas which has been detected by the gas flow rate detector. The control unit may control the humidity of the supply gas by controlling the temperature or flow rate of the cooling water to be supplied to the second humidifying portion. The cooling system may have a cooling water path for allowing the cooling water to flow to the second humidifying portion and a cooling water bypass path connected to the cooling water path for bypassing the second humidifying portion, whereas the control unit may control the humidity of the supply gas by controlling the flow rate of the cooling water to be supplied to the second humidifying portion through the cooling water path and the flow rate of the cooling water to be supplied to the cooling water bypass path.

The fuel cell system may further comprises an electricity generation detector for detecting the amount of electricity generated by the fuel cell and a control unit for controlling the humidity of at least one of the supply fuel gas and the supply oxidizing gas based on the amount of generated electricity which has been detected by the electricity generation detector. The control unit may control the humidity of the supply gas by controlling the temperature or flow rate of the cooling water to be supplied to the second humidifying portion. Alternatively, the cooling system may have a cooling water path for allowing the cooling water to flow to the second humidifying portion and a cooling water bypass path connected to the cooling water path for bypassing the second humidifying portion, whereas the control unit may control the humidity of the supply gas by controlling the flow rate of the cooling water to be supplied to the second humidifying portion through the cooling water path and the flow rate of the cooling water to be supplied to the cooling water bypass path.

With the above arrangements, the humidity of the supply fuel gas or the supply oxidizing gas can be optimized, which entails an improvement in the stability and energy efficiency of the fuel cell system. Particularly, in the case where the cooling water flow rate is controlled by the provision of the cooling water bypass path, the flow rate of the cooling water to be fed to the fuel cell and the flow rate of the cooling water to be fed to the second humidifying portion can be controlled independently, so that the cooling water can be fed to the second humidifying portion at the optimum flow rate for the humidification of the supply fuel gas or the supply oxidizing gas, while the other cooling water can be fed to the cooling water bypass path and flow without by way of the second humidifying portion. As a result, the waste of moisture and heat energy of the cooling water in the second humidifying portion can be restrained, so that the consumption of the moisture and heat energy of the cooling water in the second humidifying portion can be reduced. Therefore, it is possible not only to get efficiently the supply fuel gas or the supply oxidizing gas which is humidified suitably, but also to achieve the efficient and stable cooling of the fuel cell, which is an intrinsic function of the cooling water, so that the operating temperature of the fuel cell can be adjusted to the optimum values and the heat of the cooling water can be recovered efficiently. Accordingly, the stability and energy efficiency of the fuel cell system can be further improved. In the case where humidity is controlled according to the amount of electricity generated by the fuel cell and according to the flow rate of the supply fuel gas or supply oxidizing gas, it is unnecessary to newly provide a detector for the humidity control and the humidity control can be easily carried out in accordance with the operating condition of the fuel cell system.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The above and further objects and features of the invention will be more fully apparent from the following detailed description with accompanying drawings:

FIG. 1 diagrammatically illustrates a structure of a fuel cell system according to a first embodiment of the invention;

FIG. 2 is an oblique perspective view that diagrammatically illustrates a structure of flow path plates constituting the pre-humidifying unit shown in FIG. 1;

FIG. 3 views illustrating a structure of the pre-humidifying unit of FIG. 1 constituted by lamination of the plural flow path plates shown in FIG. 2;

FIG. 4 diagrammatically illustrates a structure of a fuel cell system according to a second embodiment of the invention;

FIG. 6 diagrammatically illustrates a structure of a fuel cell system according to a fourth embodiment of the invention;

FIG. 7 is an oblique perspective view that diagrammatically illustrates a structure of a flow path plate constituting the humidifying unit shown in FIG. 6;

FIG. 8 views illustrating a structure of the humidifying unit of FIG. 6 constituted by lamination of the plural flow path plates shown in FIG. 7;

DETAILED DESCRIPTION OF THE INVENTION

Figures 2A, 2B:
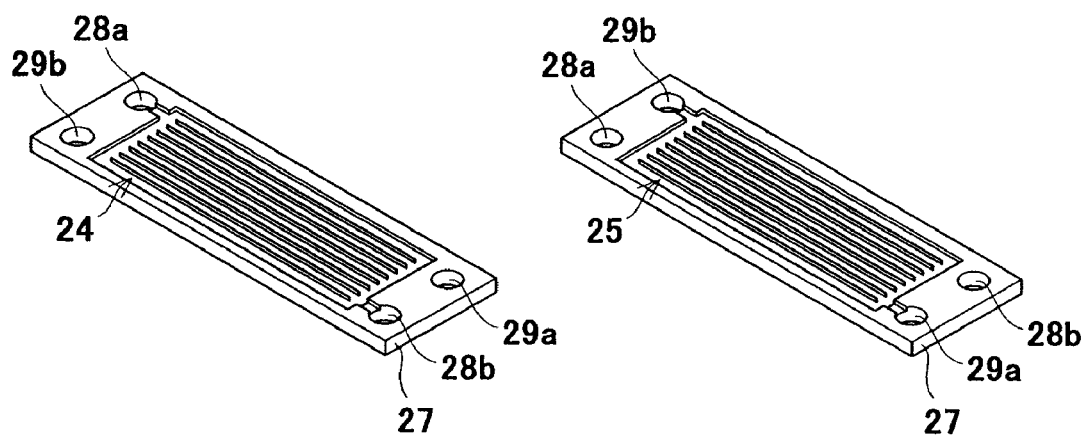
FIG. 2A shows a structure of a surface of the flow path plates and FIG. 2B shows a structure of a rear face of the flow path plates.

Referring now to the accompanying drawings, preferred embodiments of the invention will be hereinafter described.

First Embodiment

FIG. 1 diagrammatically shows a structure of a fuel cell cogeneration system (hereinafter simply referred to as "fuel cell system") according to a first embodiment of the invention.

As shown in FIG. 1, the fuel cell system of the present embodiment includes, as main components, an air supply unit 40, a pre-humidifying unit 22, a humidifying unit 21a, a fuel cell 11, a fuel supply unit 41, a fuel processing unit 42, a humidifying unit 21b, a cooling water heat radiator 13, a cooling water tank 14, and a cooling water pump 12.

Air supplied from the air supply unit 40 to the pre-humidifying unit 22 through an air path 1 is humidified by the pre-humidifying unit 22 as described later. The humidified air is supplied to the humidifying unit 21a through an air path 2 and further humidified by the humidifying unit 21a. As the humidifying unit 21a, conventional humidifiers may be used, examples of which include a bubbler for performing humidification by letting air pass through hot water heated by a heater and a humidifier which humidifies the air by directly spraying water vapor to air with an injector. The air humidified by the humidifying unit 21a is supplied to the air pole side of the fuel cell 11 through an air path 3 as an oxidizing gas. On the other hand, a material (e.g., a gas such as city gas, propane gas, methane gas, natural gas, and alcohol, which contains at least hydrogen and carbon as major component) is supplied from the fuel supply unit 41 to the fuel processing unit 42 through a fuel path 8. Herein, concretely, a reformer in which a reformed gas containing hydrogen is generated by reforming reaction, a sifter in which a carbon monoxide contained in the reformed gas is reduced by sifting reaction, and a purifier in which a carbon monoxide contained in the reformed gas passed through the sifter is further reduced by selective oxidation are used as the fuel processing unit 42. In the fuel processing unit 42, the material which has been supplied is heated in an atmosphere of water vapor, thereby generating hydrogen-rich gas. The hydrogen-rich gas is fed to the humidifying unit 21b through a fuel gas path 9a and humidified by the humidifying unit 21b. As the humidifying unit 21b, the humidifiers listed earlier as examples of the humidifying unit 21a may be used. The humidified hydrogen-rich gas is fed to the fuel pole side of the fuel cell 11 as a fuel gas for the fuel cell 11 through a fuel gas path 9b. In the fuel cell 11, the air which has been fed to the air pole side reacts to the hydrogen-rich gas (hereinafter referred to as "fuel gas") which has been fed to the fuel pole side, causing power generation, so that electricity and heat are generated.

Of the air fed to the fuel cell 11, a portion which has not been utilized in the reaction is supplied to the pre-humidifying unit 22 through an exhaust air path 4. In the pre-humidifying unit 22, moisture contained in the exhaust air which has been fed to the pre-humidifying unit 22 is utilized to humidify air to be supplied to the fuel cell 11 as oxidizing gas. The exhaust air which has passed through the pre-humidifying unit 22 is exhausted. On the other hand, the fuel gas which has not been utilized in the reaction occurring in the fuel cell 11 is exhausted.

For removal of the heat generated in the fuel cell 11, cooling water stored in the cooling water tank 14 is pressurized and supplied to the fuel cell 11 through a cooling water path 7 by the cooling water pump 12. The cooling water of the cooling water tank 14 is kept at a temperature of about 70° C. The heat of the fuel cell 11 is removed by the supplied cooling water. The cooling water which has recovered the heat and had a temperature of about 75° C. is again brought back to the cooling water tank 14 through a cooling water flow path 6. The cooling water heat radiator 13 is provided in the cooling water flow path 6, which dissipates the heat of the cooling water. Such heat dissipation cools the cooling water to about 70° C. again. The fuel cell system is designed to allow such cooling water circulation and the cooling water is stably kept at a specified temperature, so that the fuel cell 11 can be maintained at a specified temperature.

Figures 3A, 3B:
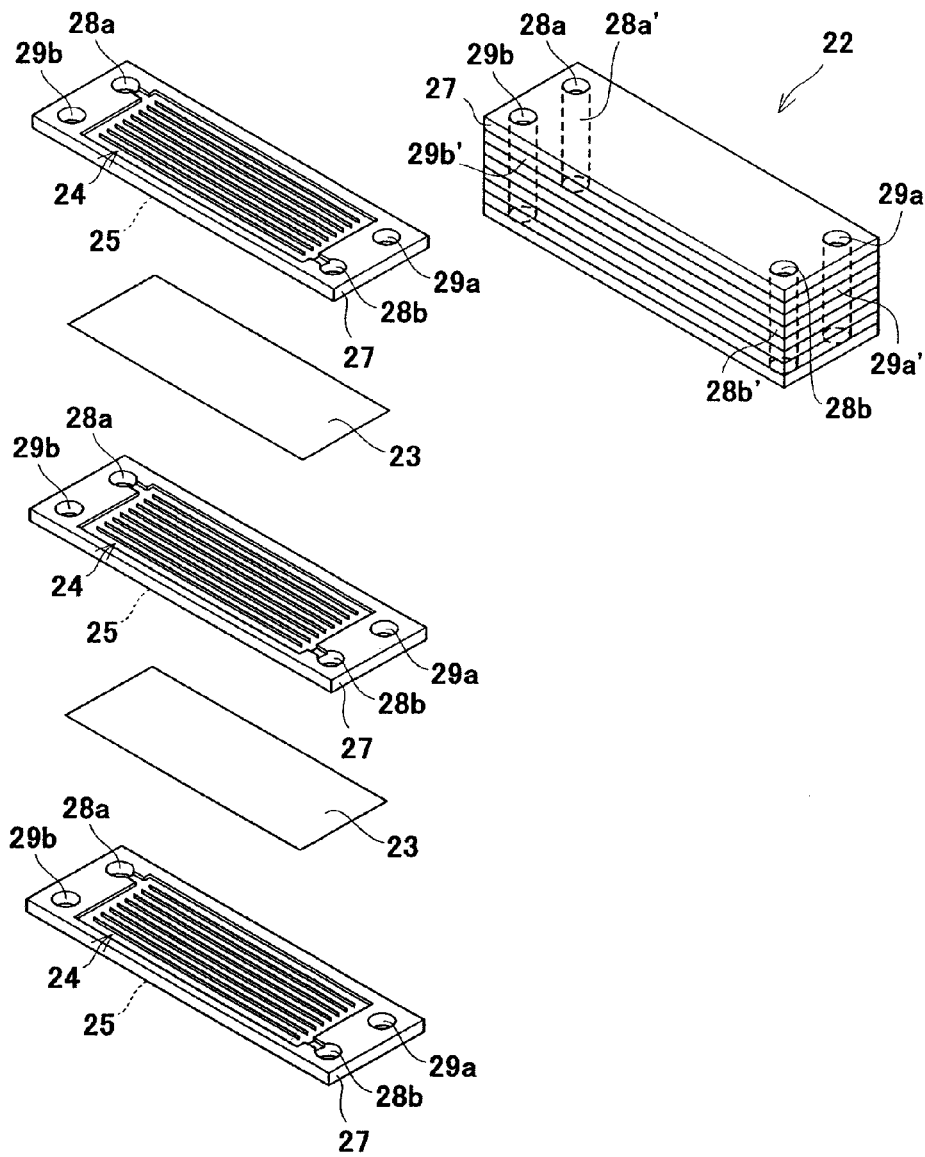
FIG. 3A is an exploded perspective view and FIG. 3B is a perspective view.

Next, the humidification of the supply air carried out by the pre-humidifying unit 22, which is a feature of the present embodiment, will be explained. FIGS. 2 and 3 are views illustrating the structure of the pre-humidifying unit 22 of the fuel cell system shown in FIG. 1. Specifically, FIG. 2 is an oblique perspective view of flow path plates which constitute the pre-humidifying unit, FIG. 2A shows a surface of the flow path plate, FIG. 2B shows a rear face of the flow path plate. Whereas FIG. 3 shows a structure of the pre-humidifying unit 22, FIG. 3A is an exploded diagrammatical perspective view, and FIG. 3B is a perspective view of the pre-humidifying unit 22 constructed by lamination of the flow path plates shown in FIGS. 2A, 2B.

As shown in FIGS. 2A, 2B and 3A, 3B, the pre-humidifying unit 22 is constituted by a plurality of flow path plates 27 which are laminated with a moisture transmitting film 23 between every two plates. Each flow path plate 27 includes a flow path 24 for air to be fed to the fuel cell 11 (hereinafter referred to as "supply air flow path") and a flow path 25 for air discharged from the fuel cell 11(hereinafter referred to as "exhaust air flow path"), the supply air flow path 24 being formed on the surface of a base material whereas the exhaust air flow path 25 is formed on the rear face of the base material. The moisture transmitting films 23, transmitting moisture selectively, include, for example, a proton-conductive, high-polymer electrolyte membrane such as Naphyon-base films. The supply air flow path 24 and exhaust air flow path 25 of each flow path plate 27 are formed by making a plurality of grooves in a stripe pattern or grooves bended in parallel with each other on the surface and rear face of a plate base material. In each flow path plate 27, manifold holes 28a, 28b which serve as a path for the supply air and manifold holes 29a, 29b which serve as a path for the exhaust air are formed. By laminating the plural flow path plates 27 such that the positions of the manifold holes 28a, 28b, 29a and 29b of each flow path plates 27 are overlapped respectively, a supply air introducing flow path 28a' constituted by the communicating manifold holes 28a, a supply air withdrawing flow path 28b' constituted by the communicating manifold holes 28b, an exhaust air introducing flow path 29a' constituted by the communicating manifold holes 29a, and an exhaust air withdrawing flow path 29b' constituted by the communicating manifold holes 29b are formed in the laminate. The supply air introducing flow path 28a' constituted by the communicating manifold holes 28a is connected to the air path 1, whereas the supply air withdrawing flow path 28b' constituted by the communicating manifold holes 28b is connected to the air path 2. With this arrangement, the air supplied from the air path 1 to the flow path plates 27 of the pre-humidifying unit 22 (i.e., the supply air) flows through the supply air flow paths 24 formed on the surfaces of the plates 27 to be sent to the air path 2. The exhaust air introducing flow path 29a' constituted by the communicating manifold holes 29a is connected to the exhaust air path 4 whereas the exhaust air withdrawing flow path 29b' constituted by the communicating manifold holes 29b is connected to the exhaust air path 5. With this arrangement, the air supplied from the exhaust air path 4 to the flow path plates 27 of the pre-humidifying unit 22 (i.e., the exhaust air) flows through the supply air flow paths 25 formed on the rear faces of the plates 27 to be sent to the exhaust air path 5. Thus, opposite flows of air are formed on the surfaces and rear faces of the flow path plates 27.

Since the plural flow path plates 27 having the above structure are laminated with a moisture transmitting film 23 between every two flow path plates 27 in the pre-humidifying unit 22, the supply air flowing through the supply air flow path 24 formed on the surface of a flow path plate 27 is in contact with the exhaust air flowing through the exhaust air flow path 25 formed on the rear face of another flow path plate 27, through a moisture transmitting film 23. Herein, since the exhaust air discharged from the fuel cell 11 contains a larger amount of moisture than the supply air, the moisture of the exhaust air is shifted to the supply air by way of the moisture transmitting film 23 within the pre-humidifying unit 22 of the above structure. The transfer of the moisture is efficiently carried out, particularly for the reason that the supply air and the exhaust air, which form opposite flows, are in contact with each other. In this way, the supply air is humidified by water vapor recovered from the exhaust air in the pre-humidifying unit 22.

The supply air which has been thus humidified by the pre-humidifying unit 22 is fed to the humidifying unit 21a via the air path 2. Since the air fed to the unit 21a is humidified by the pre-humidifying unit 22 beforehand as described earlier, humidification may be carried out to a less degree in the humidifying unit 21a, compared to the conventional case where humidification is done only by the humidifying unit 21a. For this reason, heat energy and moisture required for the humidifying unit 21a can be reduced. In the fuel cell system of the present embodiment capable of reducing energy consumption in the humidifying unit 21a by carrying out humidification of the supply air beforehand with the pre-humidifying unit 22, the energy efficiency of the overall system can be improved. Furthermore, since the moisture consumed in the humidifying unit 21a can be reduced, the amount moisture supplied to the humidifying unit 21a can be reduced. As a result, temperature change caused by supplied moisture can be restrained, so that the stable amount of humidification can be achieved in the humidifying unit 21a.

Furthermore, in the fuel cell system, since two-stage humidification is carried out using the humidifying unit 21a and the pre-humidifying unit 22 in combination, and an efficient humidification is performed, whereby even if the supply air is humidified so as to have a high dew point temperature, the large sized the humidifying unit 21a and the pre-humidifying unit 22 are not required, thus, the system can be downsized.

While the above description has been presented with a case where the fuel gas to be supplied to the fuel cell 11 (hereinafter referred to as "supply fuel gas") is humidified by the humidifying unit 21b alone, a pre-humidifying unit may be provided in the upstream of the humidifying unit 21b for stepwise humidification of the fuel gas, like the above-described case of the humidification in the air side. In such a case, the exhaust fuel gas discharged from the fuel cell 11 is fed to the pre-humidifying unit and, in this unit, the moisture of the exhaust fuel gas is shifted to the supply fuel gas, thereby performing humidification of the supply fuel gas, and the heat energy of the exhaust fuel gas is sifted to the supply fuel gas, thereby heating the supply gas. This contributes to a reduction in the energy consumption in the humidifying unit 21b and, in consequence, an improvement in the energy efficiency of the fuel cell system, and to a reduction in moisture consumption in the humidifying unit 21b and, in consequence, a stable amount of moisture. This pre-humidifying unit has a structure, like the pre-humidifying unit 22 described in the case of the humidification in the air side, in which a plurality of flow path plates are laminated with a moisture transmitting film between every two plates. In this case, a supply fuel gas flow path is formed on the surface of each flow path plate while an exhaust fuel gas flow path being formed on the rear face of the same.

In the fuel cell system, the pre-humidifying unit for humidifying the supply gas using the exhaust gas discharged from the fuel cell 11 may be provided on both the air side and the fuel side, or alternatively, on either the air side or the fuel side. The moisture content of the exhaust air from the fuel cell 11 is higher than that of the exhaust fuel gas, and the shift of only moisture through the moisture transmitting film can be effected more effectively in the case of the exhaust air than in the case of the exhaust fuel gas. In view of this, it is preferable to provide the air side with the pre-humidifying unit 22.

In the following description of the second to ninth embodiments, the humidification carried out on the air supply side of the fuel cell 11 will be explained, but it should be noted that the same arrangement and humidification technique as in the air supply side are applicable to the fuel gas supply side in these embodiments, similarly to the first embodiment.

Second Embodiment

FIG. 4 diagrammatically illustrates a structure of a fuel cell system according to a second embodiment of the invention. As shown in FIG. 4, the fuel cell system of the present embodiment has the same structure as in the fuel cell system of the first embodiment, except that a humidifying unit 21a' for humidifying the supply air with circulating cooling water used for cooling the fuel cell 11 is provided in place of the humidifying unit 21a constituted by a conventional humidifier such as bubblers. Hereinafter, the point of difference will be described.

In the system of the present embodiment, the air path 2 for supplying the air processed by the pre-humidifying unit 22 is connected to the humidifying unit 21a' and the air path 3 for supplying the air humidified by the unit 21a' to the fuel cell 11 is also connected to the humidifying unit 21a'. Connected further to the humidifying unit 21a' are cooling water paths 6a, 6b through which the cooling water recovered from the fuel cell 11 flows.

As the humidifying unit 21a' has a structure substantially similar to that of the pre-humidifying unit 22 of the first embodiment, the structure of the humidifying unit 21a' will be described herein with reference to FIGS. 2A, 2B and 3A, 3B. In the pre-humidifying unit 21a', a flow path (supply air flow path) 24 for the air to be supplied to the fuel cell 11 is formed on the surface of each flow path plate 27 whereas a flow path 25 for the cooling water recovered from the fuel cell 11 (hereinafter referred to as "cooling water flow path") is formed on the rear face of the flow path plate 27. A plurality of such flow path plates 27 are laminated with a moisture transmitting film 23 between every two plates 27, thereby forming the humidifying unit 21a'. In each flow path plate 27 of the humidifying unit 21a', the manifold holes 28a, 28b constitute a flow path for the supply air and the manifold holes 29a, 29b constitute a flow path for the cooling water. By laminating the plural flow path plates 27 such that the positions of the manifold holes 28a, 28b, 29a and 29b of each flow path plates 27 are overlapped respectively, a supply air introducing flow path 28a' constituted by the communicating manifold holes 28a, a supply air withdrawing flow path 28b' constituted by the communicating manifold holes 28b, a cooling water introducing flow path 29a' constituted by the communicating manifold holes 29a, and a cooling water withdrawing flow path 29b' constituted by the communicating manifold holes 29b are formed. The supply air introducing flow path 28a' constituted by the communicating manifold holes 28a is connected to the air path 2, whereas the supply air withdrawing flow path 28b' constituted by the communicating manifold holes 28b is connected to the air path 3. With this arrangement, the air supplied from the air path 2 to the flow path plates 27 of the humidifying unit 21a' (i.e., the supply air) flows through the supply air flow paths 24 formed on the surfaces of the plates 27 to be sent to the air path 3. The cooling water introducing flow path 29a' constituted by the communicating manifold holes 29a is connected to the cooling water path 6a whereas the cooling water withdrawing flow path 29b' constituted by the communicating manifold holes 29b is connected to the cooling water path 6b. With this arrangement, the cooling water supplied from the cooling water path 6a to the flow path plates 27 of the humidifying unit 21a' flows through the cooling water flow paths 25 formed on the rear faces of the plates 27 to be sent to the cooling water flow path 6b. Thus, opposite flows of supply air and cooling water are formed on the surfaces and rear faces of the flow path plates 27.

Since the plural flow path plates 27 having the above structure are laminated with a moisture transmitting film 23 between every two plates in the humidifying unit 21a', the supply air flowing through the supply air flow path 24 formed on the surface of a flow path plate 27 is in contact with the cooling water flowing through the cooling water flow path 25 formed on the rear face of another flow path plate 27, through a moisture transmitting film 23. In the humidifying unit 21a' having such a structure, the moisture of the cooling water is transferred to the supply air through the moisture transmitting film 23. The transfer of the moisture is efficiently carried out, particularly for the reason that the supply air and the cooling water are in contact with each other, forming opposite flows. In this way, the supply air is humidified by the moisture recovered from the cooling water in the humidifying unit 21a', while heat energy transfers from the cooling water to the supply air with moisture, and so that the supply air is heated.

In the present embodiment, since the pre-humidifying unit 22 is positioned in the upstream of the humidifying unit 21a', the same effect as in the first embodiment can be attained. Further, since the supply air is humidified by the humidifying unit 21a' utilizing cooling water in the present embodiment, the energy and moisture required for the humidifying unit 21a' can be reduced, compared to the case where humidification is done by a bubbler or similar device like the first embodiment. Therefore, the energy consumption in the humidifying unit 21a' can be reduced and the energy efficiency of the overall system can be improved. In addition, since the temperature of the circulating cooling water used for cooling the fuel cell 11 is constantly kept at about 70 to 75□ in the fuel cell system as discussed earlier, and, particularly, as described in the first embodiment, herein the amount of moisture supplied to the humidifying unit 21a' can be reduced by the pre-humidifying unit 22, so that the temperature change in humidifying unit 21a' can be restrained. Therefore, use of such cooling water maintained at a specified temperature enables stable humidification. Further, there is no need to provide the humidifying unit 21a' with another humidifying means such as bubblers and injectors and the cooling water circulation system within the fuel cell system is used, so that humidification can be carried out with a simple system configuration. Consequently, the fuel cell system can be simplified and the coast can be reduced.

While the humidification of the supply air is carried out using the cooling water recovered from the fuel cell 1 in the present embodiment, this embodiment may be modified such that the humidification may be carried out by supplying the humidifying unit 21a' with the cooling water before supplied to the fuel cell 11, that is, the cooling water flowing in the cooling water path 7. Another possible modification is such that, apart from the cooling water circulation system for cooling the fuel cell 11, there are provided a path for feeding the cooling water from the cooling water tank 14 to the humidifying unit 21a' and a path for withdrawing the cooling water from the humidifying unit 21a' and the humidification is carried out with the humidifying unit 21a' using the cooling water flowing in these paths.

Third Embodiment

Figure 5:
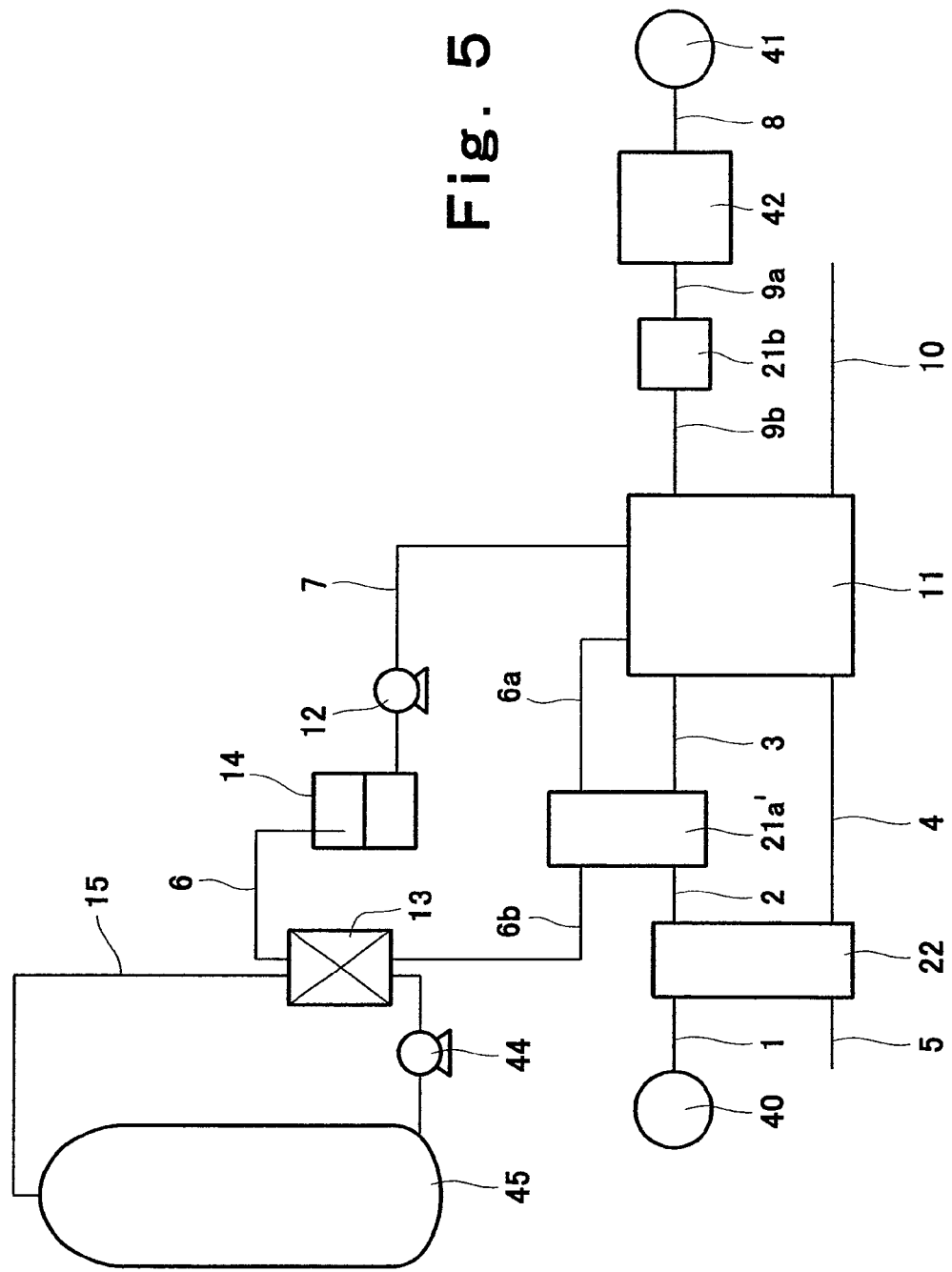
FIG. 5 diagrammatically illustrates a structure of a fuel cell system according to a third embodiment of the invention.

FIG. 5 diagrammatically shows a structure of a fuel cell system according to a third embodiment of the invention. As shown in FIG. 5, the structure of the fuel cell system of the third embodiment is similar to that of the second embodiment, except that heat dissipated from the cooling water by a cooling water heat radiator 13, which comprises a heat exchanger, is utilized for heating the water stored in a hot water reserve tank 45. The point of difference will be described below.

The system of the present embodiment has the hot water reserve tank 45, a hot water pump 44 for pumping water stored in the tank 45, a hot water circulation path 15 for bringing the water sent from the tank 45 back to the tank 45 by way of the cooling water heat radiator 13. In such a system, heat is shifted from the cooling water after utilized for the humidification in the humidifying unit 21a' to the cooling water heat radiator 13 and this heat is given to the water circulating in the hot water circulation path 15. With this arrangement, the water stored in the hot water reserve tank 45 is heated and the hot water is then stored in the tank 45.

Since the present embodiment is provided with the pre-humidifying unit 22, the moisture shifted from the cooling water to the supply air in the humidification by the humidifying unit 21a' and the heat which is shifted to the supply air together with the moisture can be reduced as discussed in the second embodiment. Since the amount of heat deprived from the cooling water by the humidification is thus small, a larger amount of heat can be recovered from the cooling water and utilized for heating the water stored in the hot water reserve tank 45. Accordingly, hot water can be effectively obtained and the temperature of the hot water stored can be increased. As a result, the energy efficiency of the overall system can be improved. In addition, the hot water thus recovered is high in temperature and therefore has a wide range of applications, so that the usefulness of the heat recovered from the fuel cell 11 can be increased.

While the present embodiment has been particularly described with a case where the structure of the fuel cell system of the second embodiment is employed as the basic structure, the present embodiment including the hot water reserve tank is applicable to cases where the structure of the fuel cell system of the first embodiment is adopted as the basic structure.

Fourth Embodiment

FIG. 6 diagrammatically shows a structure of a fuel cell system according to a fourth embodiment of the invention. As shown in FIG. 6, the fuel cell system of the fourth embodiment has the same structure as in the third embodiment, except that the pre-humidifying unit 22 and the humidifying unit 21a' are integrally formed, in other words, a humidifying unit 50 comprised of a pre-humidifying portion 22' and a humidifying portion 21' is provided. The point of difference will be described below.

In the humidifying unit 50, the air path 1 and the exhaust air paths 4, 5 are connected to the pre-humidifying portion 22'. The air path 1 is used for supplying the supply air, the exhaust air path 4 is used for supplying the exhaust air discharged from the fuel cell 11, and the exhaust air path 5 is used for withdrawing the exhaust air which has been used in humidification from the pre-humidifying portion 22'. Connected to the humidifying portion 21' are the cooling water path 6a for supplying the cooling water after cooling the fuel cell 11, the cooling water path 6b for withdrawing the cooling water which has been used in humidification from the humidifying portion 21' and the air path 3 for supplying the humidified supply air to the fuel cell 11.

Figures 7A, 7B:
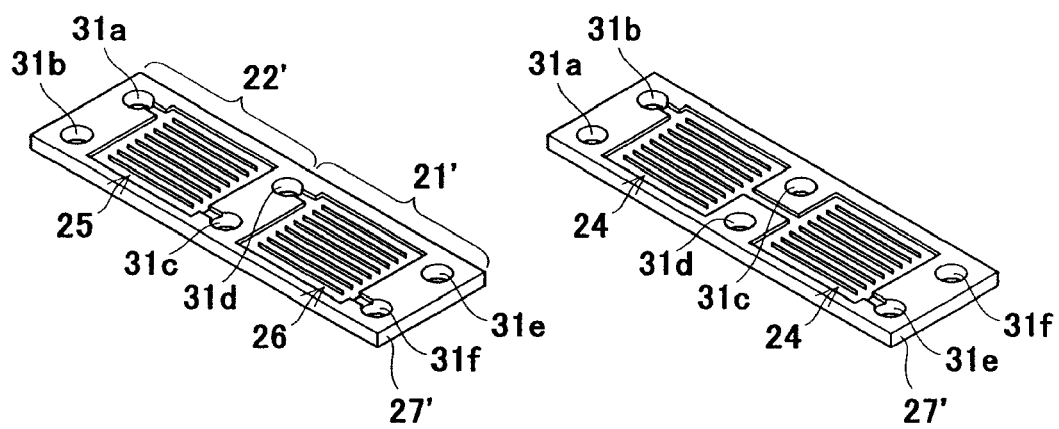
FIG. 7A shows a structure of a surface of the flow path plates and FIG. 7B shows a structure of a rear face of the flow path plates.
Figures 8A, 8B:
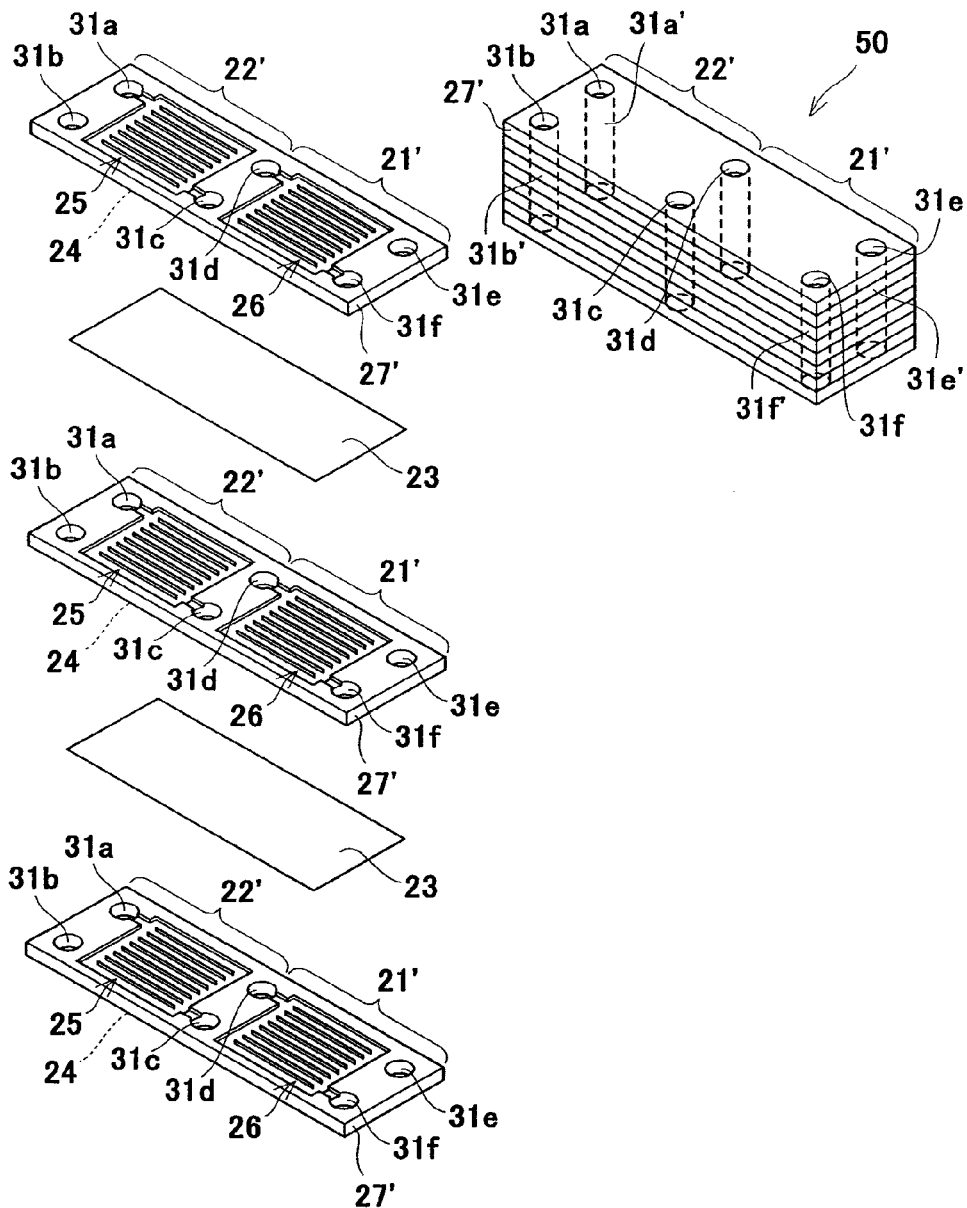
FIG. 8A is an exploded perspective view and FIG. 8B is a perspective view.

FIGS. 7, 8 are views which diagrammatically show a structure of the humidifying unit 50, wherein FIGS. 7A, 7B are oblique perspective views of flow path plates constituting the humidifying unit 50, FIG. 7A shows a surface of the flow path, and FIG. 7B shows a rear face of the flow path plate. FIGS. 8A, 8B show a structure of the humidifying unit 50 formed by laminating the plural flow path plates shown in FIG. 7, FIG. 8A is an exploded perspective view, FIG. 8B is a perspective view.

As shown in FIGS. 7A, 7B, and FIGS. 8A, 8B, the pre-humidifying portion 22' of the humidifying unit 50 has the same structure as the pre-humidifying units 22 of the first to third embodiments, whereas the humidifying unit 21' has the same structure as the humidifying units 21a' of the first to third embodiments. More specifically, the humidifying unit 50 has a plurality of flow path plates 27' which are laminated with a moisture transmitting film 23 interposed between every two plates 27'. Formed on the surface of each flow path plate 27' are the exhaust air flow path 25 and a cooling water flow path 26. The area where the exhaust air flow path 25 is formed corresponds to the pre-humidifying portion 22' and the area where the cooling water flow path 26 is formed corresponds to the humidifying portion 21'. Formed on the rear face of each flow path plate 27' is the supply air flow path 24 which continuously extends throughout the pre-humidifying portion 22' and the humidifying portion 21', registering the bottoms of the exhaust air flow path 25 and the cooling water flow path 26. In the flow path plate 27', a plurality of manifold holes 31a to 31f are formed in other areas than the areas where the paths 24, 25, 26 are formed. The flow path plates 27' are laminated such that the manifold holes 31a to 31f of each flow path plates 27' are overlapped respectively. With this arrangement, in the laminate, there are formed an exhaust air introducing flow path 31c' constituted by the communicating manifold holes 31c, an exhaust air withdrawing flow path 31a' constituted by the communicating manifold holes 31a, a cooling water introducing flow path 31f' constituted by the communicating manifold holes 31f, and a cooling water withdrawing flow path 31d' constituted by the communicating manifold holes 31d. There are also formed a supply air introducing flow path 31b' constituted by the communicating manifold holes 31b and a supply air withdrawing flow path 31e' constituted by the communicating manifold holes 31e. The exhaust air introducing flow path 31c' constituted by the communicating manifold holes 31c is connected to the exhaust air path 4 and the exhaust air withdrawing flow path 31a' constituted by the communicating manifold holes 31a is connected to the exhaust air path 5. With this arrangement, the exhaust air supplied from the exhaust air path 4 to the pre-humidifying portion 21' of the humidifying unit 50 flows through the exhaust air paths 25 formed on the surfaces of the flow path plates 27' to be sent to the exhaust air path 5. The cooling water introducing flow path 31f' constituted by the communicating manifold holes 31f is connected to the cooling water flow path 6a and the cooling water withdrawing flow path 31d' constituted by the communicating manifold holes 31d is connected to the cooling water flow path 6b. With this arrangement, the cooling water supplied from the cooling water flow path 6a to the humidifying portion 21' of the flow path plates 27' of the humidifying unit 50 flows through the cooling water flow paths 26 formed on the surfaces of the plates 27' to be sent to the cooling water flow path 6b. Thus, on the surfaces of the flow path plates 27', a flow of exhaust air is formed in the pre-humidifying portion 22' whereas a flow of cooling water is formed in the humidifying portion 21'. The flows of exhaust air and cooling water have the same direction.

The supply air introducing flow path 31b' constituted by the communicating manifold holes 31b is connected to the air path 1 and the supply air withdrawing flow path 31e' constituted by the communicating manifold holes 31e is connected to the air path 3. With this arrangement, the supply air fed from the air path 1 to the pre-humidifying portion 22' of the flow path plates 27' of the humidifying unit 50 flows through the supply air flow paths 24 formed on the rear faces of the plates 27' and then flows through the supply air flow paths 24 of the humidifying portion 21'. Thereafter, the supply air is sent to the air path 3. Accordingly, the flow of supply air formed throughout the pre-humidifying portion 22' and the humidifying portion 21' has a direction opposite to the direction of the flows of exhaust air and cooling water formed on the surfaces of the plates 27'.

The plural flow path plates 27' having the above structure are thus laminated with a moisture transmitting film 23 interposed between every two plates 27' in the humidifying unit 50, and therefore, in the pre-humidifying portion 22', the exhaust air flowing in the exhaust air flow path 25 formed on the surface of one flow path plate 27' comes in contact with the supply air flowing in the supply air flow path 24 formed on the rear face of another flow path plate 27' through a moisture transmitting film 23. Therefore, in the pre-humidifying portion 22', moisture is shifted from the exhaust air to the supply air through the moisture transmitting film 23 as discussed in the description of the pre-humidifying unit 22. In the humidifying portion 21', the cooling water flowing in the cooling water flow path 26 formed on the surface of one flow path plate 27' comes in contact with the supply air flowing in the supply air flow path 24 formed on the rear face of another flow path plate 27' through the moisture transmitting film 23. Therefore, in the humidifying portion 21', moisture is shifted from the cooling water to the supply air through the moisture transmitting film 23 as discussed in the description of the humidifying unit 21*a*'. Since the supply air is in contact with the exhaust air and the cooling water, flowing in a direction opposite to the direction of the flow of exhaust air and the cooling water as described earlier, the transfer of the moisture and the heat energy can be effectively carried out within the pre-humidifying portion 22' and the humidifying portion 21'. In the humidifying unit 50, humidification of the supply air by use of the exhaust air is done in the pre-humidifying portion 22' whereas humidification of the supply air by use of the cooling water is further done in the humidifying portion 21'.

The same effect as described in the third embodiment can be achieved by the fuel cell system of the above structure. By virtue of the humidifying unit 50 having the pre-humidifying portion 22' and the humidifying portion 21' which are integral with each other, piping between the pre-humidifying portion 22' and the humidifying portion 21' (concretely, pipeline comprising the air path 2 in the third embodiment) becomes unnecessary. As a result, the system can be downsized while preventing the heat loss in the pipeline to achieve improved heat efficiency.

While the above discussion has been done with a case where the pre-humidifying portion 22' and the humidifying portion 21' are horizontally aligned in the humidifying unit 50, the layout of the pre-humidifying portion 22' and the humidifying portion 21' is not limited to this. For instance, the pre-humidifying portion 22' and the humidifying portion 21' may be integrally laminated.

Figure 9:
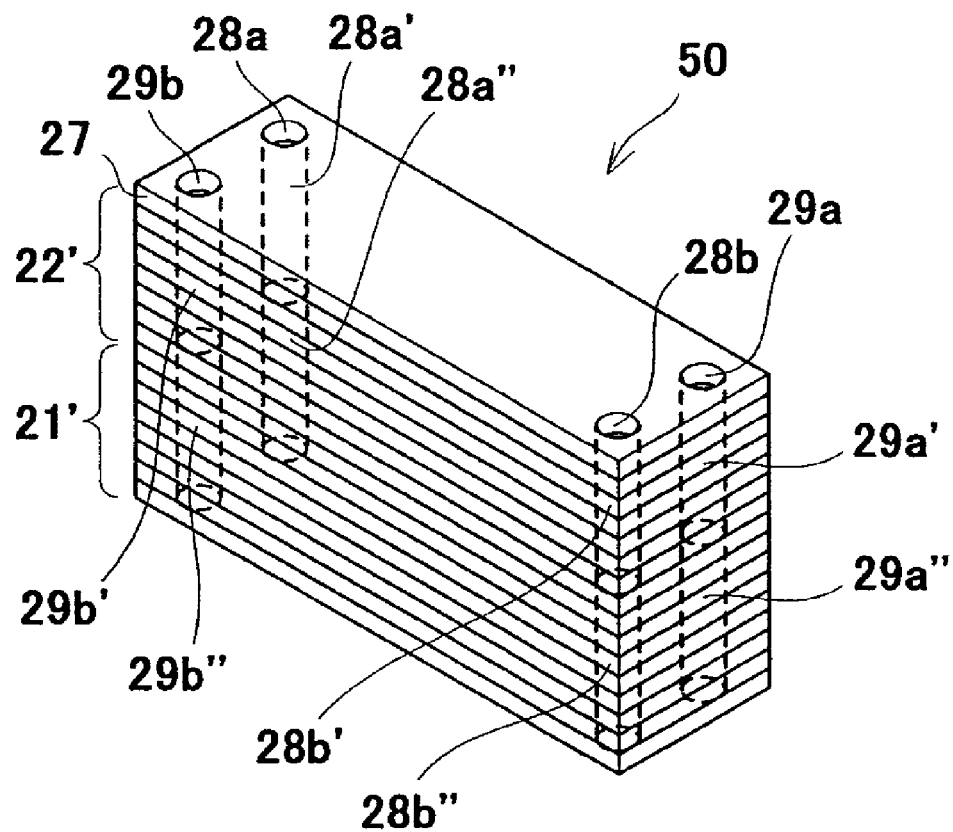
FIG. 9 is a perspective view illustrating a structure of a humidifying unit of a fuel cell system according to a modification of the fourth embodiment of the invention.

FIG. 9 is a perspective view showing a structure of the humidifying portion 50 according to a modification of the fuel cell system of the present embodiment. As shown in FIG. 9, the humidifying unit 50 of this modification is designed such that the humidifying portion 21' is laminated on the pre-humidifying portion 22' so that the pre-humidifying portion 22' and the humidifying portion 21' are vertically aligned. The pre-humidifying portion 22' has a structure similar to the above-described pre-humidifying unit 22 while the humidifying portion 21' has a structure similar to the above-described humidifying unit 21*a*'. The air path 1 is connected to the supply air introducing flow path 28*a*' formed by the manifold holes 28*a* of the flow path plates 27 constituting the pre-humidifying portion 22'. The exhaust air path 4 is connected to the exhaust air withdrawing flow path 29*a*' formed by the manifold holes 29*a*, and the exhaust air path 5 is connected to the exhaust air withdrawing flow path 29*b*' formed by the manifold holes 29*b*. The air path 3 is connected to the supply air withdrawing flow path 28*a*" formed by the manifold holes 28*a* of the flow path plates 27 constituting the humidifying portion 21'. The cooling water path 6*a* is connected to the cooling water introducing flow path 29*b*" formed by the manifold holes 29*b*, and the cooling water path 6*b* is connected to the cooling water withdrawing flow path 29*a*" formed by the manifold holes 29*a*. The supply air withdrawing flow path 28*b*' formed by the manifold holes 28*b* in the pre-humidifying portion 22' is connected to the supply air introducing flow path 28*b*" formed by the manifold holes 28*b* in the humidifying portion 21'.

In the humidifying unit 50 having the above structure, the supply air is fed to the pre-humidifying portion 22' via the air path 1 and then flows into the supply air flow path 24 formed on the surface of each flow path plate 27, entering the supply air withdrawing flow path 28' formed by manifold holes 28*b*. On the other hand, the exhaust air fed to the pre-humidifying portion 22' via the exhaust air path 4 flows into the exhaust air flow path 25 formed on the rear face of each flow path plate 27 to be sent to the exhaust air path 5. In the pre-humidifying portion 22', the flows of supply air and exhaust air are formed on the surfaces and rear faces of the flow path plates 27, which oppose to each other, so that the moisture and heat energy of the exhaust air are shifted to the supply air through the water transmitting films 23, thereby performing humidification and heating of the supply air. The supply air thus humidified vertically flows in the supply air withdrawing flow path 28*b*' constituted by the manifold holes 28*b* and is supplied to the flow path plates 27 of the humidifying portion 21' through the supply air introducing flow path 28*b*" in the humidifying portion 21'. On the surface of each flow path plate 27 in the humidifying portion 21', the supply air fed from the pre-humidifying portion 22' flows in the supply air flow path 24. Herein, the aforesaid flow opposed to the air supply flow paths 24 in the pre-humidifying portion 22' is formed. In the humidifying portion 21', the cooling water is fed to the cooling water flow path 26 formed on the rear face of each flow path plate 27 through the cooling water path 6*a*. The cooling water flows in the cooling water flow paths 26 on the rear faces of the plates 27 to be sent to the cooling water path 6*b*. In the humidifying portion 21', the flows of supply air and cooling water are thus formed on the surfaces and rear faces of the flow path plates 27, so that the moisture and heat energy of the cooling water is further shifted to the supply air through the moisture transmitting films 23 as described earlier, thereby performing humidification and heating of the supply air furthermore. With the humidifying unit 50 having such a structure, the same effect as in the case where the pre-humidifying portion 22' and the humidifying portion 21' are horizontally aligned can be achieved. In the arrangement in which the pre-humidifying portion 22' and the humidifying portion 21' are horizontally aligned, it is unnecessary to take the step of stacking the pre-humidifying portion 22' on the humidifying portion 21' like the case of the vertical lamination of the portions 21' and 22'. Therefore, the manufacturing process can be simplified, leading to a reduction in the cost of the fuel cell system.

Fifth Embodiment

Figure 10:
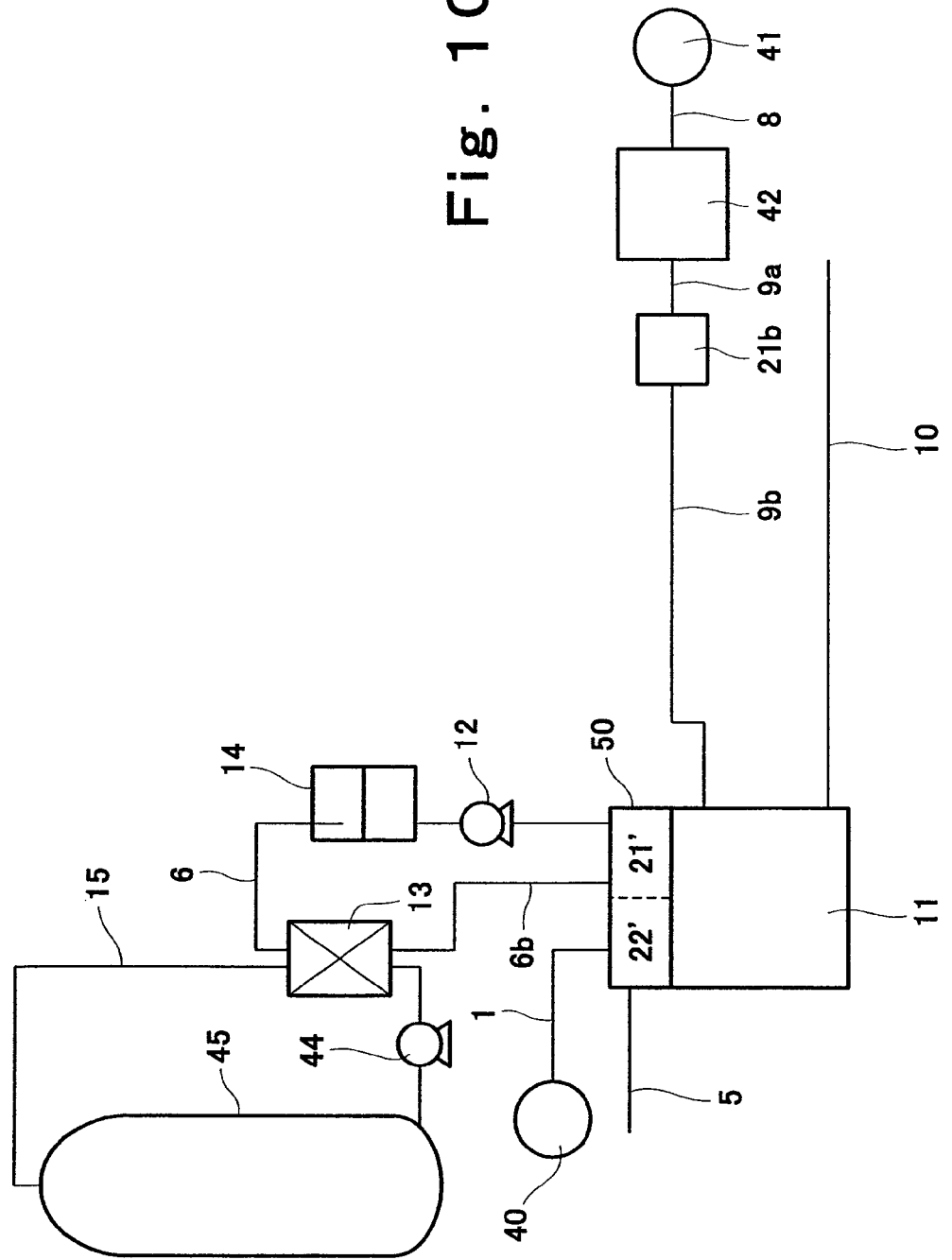
FIG. 10 diagrammatically illustrates a structure of a fuel cell system according to a fifth embodiment of the invention.

FIG. 10 diagrammatically shows a structure of a fuel cell system according to a fifth embodiment of the invention. As shown in FIG. 10, the fuel cell system of the fifth embodiment has the same structure as the fuel cell system of the fourth embodiment except that the fuel cell 11 is adjacent to the humidifying unit 50. Hereinafter, the point of difference will be described.

The fuel cell system of the fifth embodiment is designed such that the fuel cell 11 is disposed in a position adjacent to the humidifying unit 50 of the fourth embodiment. Connected to the pre-humidifying portion 22' of the humidifying unit 50 are the air path 1 for supplying the supply air and the exhaust air path 5 for withdrawing the exhaust air which has been used in the humidification. Connected to the humidifying portion 21' of the humidifying unit 50 are the cooling water path 7 for supplying the cooling water and the cooling water path 6 for withdrawing the cooling water which has been used in the humidification of the supply air and cooling of the fuel cell 11. With this arrangement, since the fuel cell 11 and the humidifying unit 50 are integrally formed, it becomes possible to supply directly the exhaust air from the fuel cell 11 to the pre-humidifying portion 22' of the humidifying unit 50. In addition, the cooling water can be circulated, by directly supplying it to and recovering it from the fuel cell 11 through the humidifying portion 21' of the humidifying unit 50. Further, the supply air can be directly fed from the humidifying portion 21' to the fuel cell 11. Accordingly, the fuel cell system of the present embodiment enables direct feeding of the exhaust air, supply air and cooling water without providing a path composed of a pipeline etc. between the fuel cell 11 and the humidifying unit 50, so that the air paths 2, 3, the exhaust air path 4 and the cooling water paths 6a, 6b which are employed in the system of the fourth embodiment becomes unnecessary. Therefore, the need for pipelines constituting these paths is eliminated and the heat loss in the pipelines can be prevented. As a result, the heat efficiency of the fuel cell system can be improved and downsizing of the system becomes possible. In addition, particularly, since there is no need to provide a pipeline for feeding the supply air from the humidifying portion 21' of the humidifying unit 50 to the fuel cell 11 (corresponding to the air path 3), the moisture of condensed dew caused by heat dissipation in the pipeline can be prevented from entering the fuel cell 11 with the result that the system can be stably operated.

Provided that the fuel cell 11 is in contact with the humidifying unit 50, the layout of the fuel cell 11 and the humidifying unit 50 is not particularly limited. It should, however, be noted that the arrangement in which the fuel cell 11 is placed in direction of the stacking direction of the flow path plates 27 is more preferable in view of downsizing of the system, because the complicated piping is not required in this case. Although the above discussion has been presented with a case where the humidifying unit 50 comprised of the pre-humidifying portion 22' integral with the humidifying portion 21' is in contact with the fuel cell 11, the structure of the system in which the pre-humidifying unit 22 and the humidifying portion 21a' are separately provided like the third embodiment and the humidifying portion 21a' is in contact with the fuel cell 11, is allowed.

Sixth Embodiment

Figure 11:
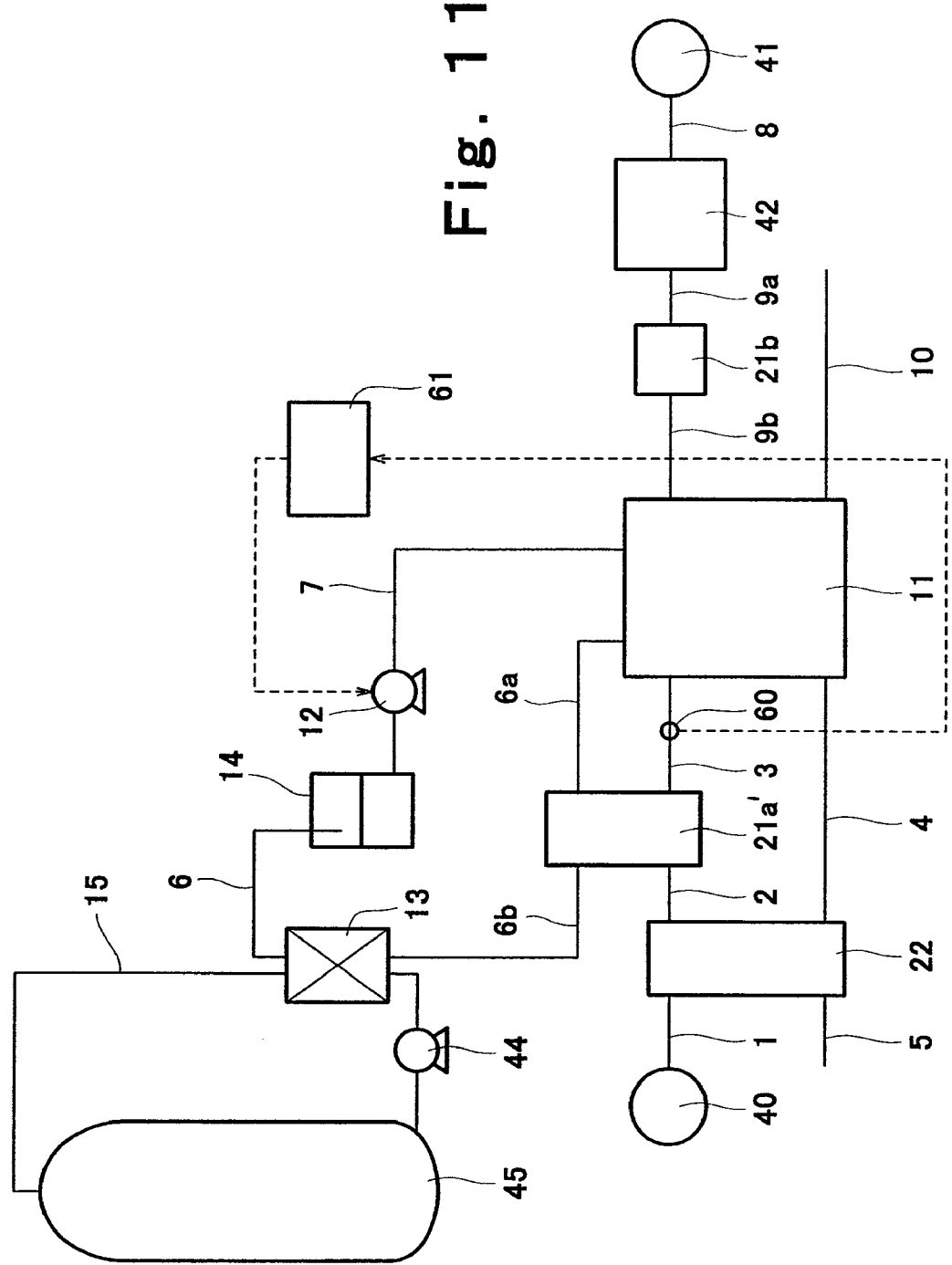
FIG. 11 diagrammatically illustrates a structure of a fuel cell system according to a sixth embodiment of the invention.

FIG. 11 diagrammatically shows a structure of a fuel cell system according to a sixth embodiment of the invention. As shown in FIG. 11, the fuel cell system of the sixth embodiment has the same structure as the fuel cell system of the third embodiment except the following point. Specifically, in the fuel cell system of the present embodiment, the air path 3 for supplying air from the humidifying unit 21a' to the fuel cell 11 is provided with a detector 60 for detecting the humidity of the supply air (concretely, the moisture of the supply air) and with a control unit 61 for controlling the flow rate of the cooling water to be supplied to the humidifying unit 21a' according to information from the detector 60. The control unit 61 controls the output or revolution speed of the cooling water pump 12 thereby performing the flow rate control for the cooling water.

In the fuel cell system of the above structure, the detector 60 detects the humidity of the supply air fed to the fuel cell 11 by way of the air path 3. As the detector 60, an electric-resistance type moisture sensor, thermistor type moisture sensor or the like may be used. The detector 60 is disposed just in front of the fuel cell 11 in the air path 3. The information on the humidity obtained by the detector 60 is transmitted to the control unit 61.

If the humidity detected by the detector 60 is smaller than a specified value for instance, the control unit 61 increases the output of the cooling water pump 12 or the revolution speed of the pump 12, based on the humidity information. This causes the amount of cooling water to be fed to the humidifying unit 21a' to increase and as a result, the amount of moisture shifted from the cooling water to the supply air in the humidifying unit 21a', that is, the degree of humidification is increased. Thus, the humidity of the supply air can be adjusted to an optimum value.

On the other hand, if the humidity is greater than the specified value, the control unit 61 reduces the output of the cooling water pump 12 or the revolution speed of the pump 12, based on the humidity information. This causes the amount of cooling water to be fed to the humidifying unit 21a' to decrease and as a result, the amount of moisture shifted from the cooling water to the supply air in the humidifying unit 21a', that is, the degree of humidification is reduced. Thus, the humidity of the supply air can be adjusted to an optimum value.

As described above, the humidity of the supply air can be optimized by controlling the flow rate of the cooling water to be supplied, according to the humidity of the supply air. This brings about an improvement in the heat efficiency and stability of the fuel cell system.

Figure 12:
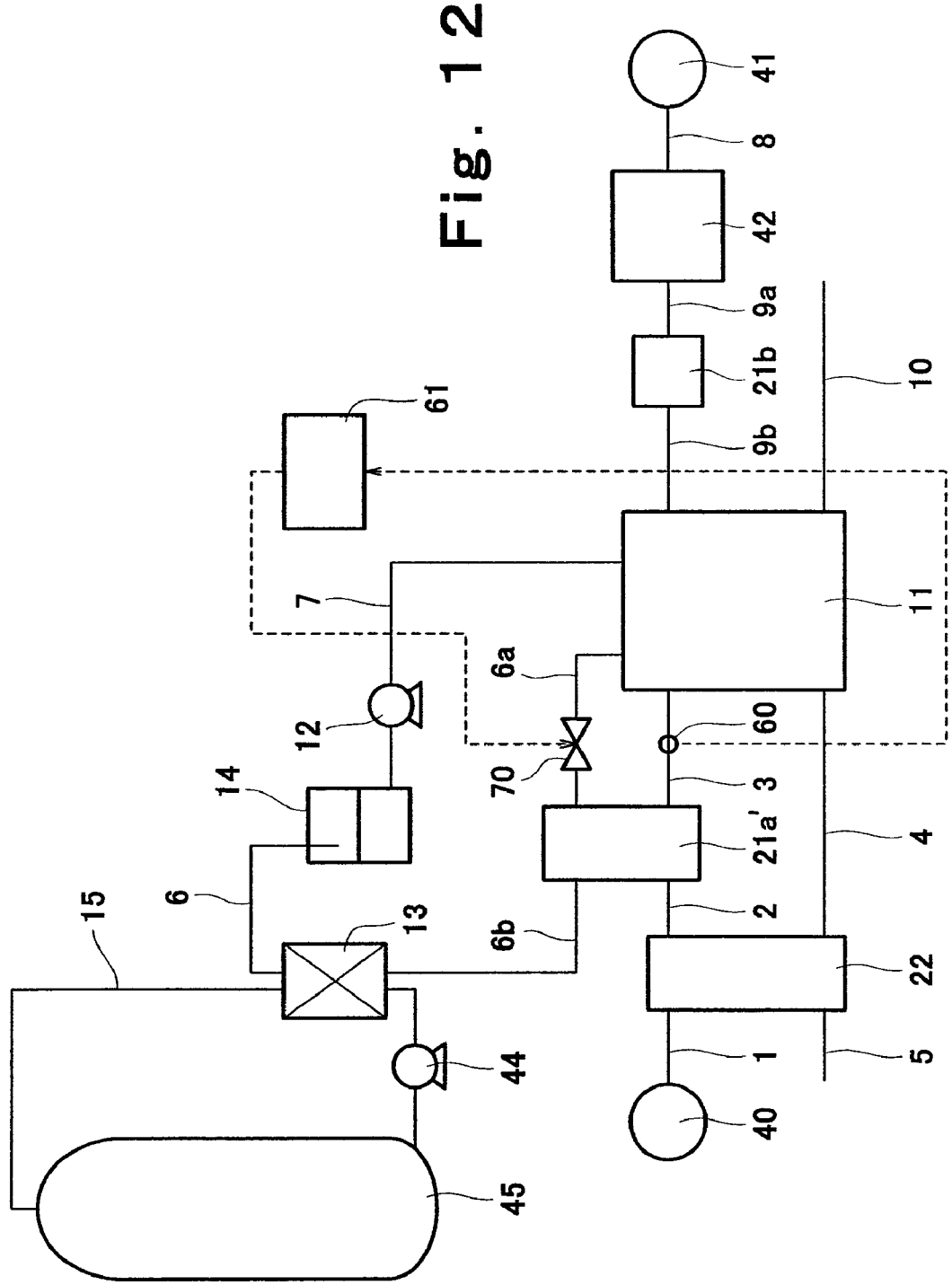
FIG. 12 diagrammatically illustrates a structure of a fuel cell system according to a modification of the sixth embodiment of the invention.

Although the above discussion is associated with a case where the flow rate of the cooling water to be supplied to the humidifying unit 21a' is adjusted by controlling the cooling water pump 12 with the control unit 61, the method of adjusting the flow rate of the cooling water is not limited to this. For example, the present embodiment may be modified such that, as shown in FIG. 12, the cooling water path 6a for supplying the cooling water to the humidifying unit 21a' is provided with a proportional valve 70 which is automatically openable and closable and such that the control unit 61 controls the opening/closing of the proportional valve 70 based on the information sent from the detector 60. In this arrangement, if the humidity detected by the detector 60 is smaller than a specified value for instance, the proportional valve 70 is more widely opened according to the humidity information from the control unit 61. This causes the amount of cooling water to be fed to the humidifying unit 21a' to increase and as a result, the amount of moisture shifted from the cooling water to the supply air in the humidifying unit 21a', that is, the degree of humidification is increased. On the other hand, if the humidity of the supply air is greater than the specified value, the control unit 61 closes the proportional valve 70 based on the humidity information such that the valve 70 is less widely opened. This causes the amount of cooling water to be fed to the humidifying unit 21a' to decrease and as a result, the amount of moisture shifted from the cooling water to the supply air in the humidifying unit 21a', that is, the degree of humidification is reduced. Thus, the same effect as in the foregoing description can be achieved by adjusting the amount of cooling water to be supplied to the humidifying unit 21a', by means of the proportional valve 70.

Furthermore, although the above discussion is associated with the case where the humidity of supply air is adjusted by controlling the flow rate of the cooling water, the method of adjusting humidity of the supply air is not limited this. For example, the humidity of the supply air may be adjusted by controlling the temperature of the cooling water supplied to the humidifying portion 21a'.

The temperature of the cooling water to be supplied to the humidifying unit 21a' is a factor that affects the shift of moisture from the cooling water to the supply air in the humidifying unit 21a' and therefore the temperature of the cooling water concerns the humidity of the supply air. The amount of moisture sifting to the supply air becomes larger when the temperature of the cooling water is high, while, the amount of moisture sifting to the supply air becomes smaller when the temperature of the cooling water is low. Thus, for example, as the modification of this embodiment, instead of adjusting the flow rate of the cooling water as described above, the temperature of the cooling water may be adjusted according to the humidity of the supply air by controlling the temperature of the cooling water by use of heater or the like, or by controlling the amount of radiated heat in the cooling water heat radiator 13. With this arrangement, if the humidity detected by the detector 60 is smaller than a specified value for instance, the control unit 61 controls, according to the humidity information, such heater to heat the cooling water, or the cooling water heat radiator 13 to reduce the amount of the radiated heat. This causes the rise of temperature of cooling water to be fed to the humidifying unit 21a' to increase and as a result, the amount of moisture shifted from the cooling water to the supply air in the humidifying unit 21a', that is, the degree of humidification is increased. On the other hand, if the humidity of the supply air is greater than the specified value, the control unit 61 controls, according to the humidity information, such heater to stop to lower the temperature of the cooling water, or the cooling water heat radiator 13 to increase the amount of the radiated heat. This causes the lowering of the temperature of cooling water to be fed to the humidifying unit 21a' to decrease and as a result, the amount of moisture shifted from the cooling water to the supply air in the humidifying unit 21a', that is, the degree of humidification is reduced. Thus, the same effect as in the foregoing description can be achieved by adjusting the temperature of cooling water to be supplied to the humidifying unit 21a'.

The above discussion is associated with a case where the basic structure of the fuel cell system is the same as that of the third embodiment, but the present embodiment in which the flow rate of the cooling water is adjusted in accordance with the humidity of the supply air is also applicable to cases where the structure of any of the fuel cell systems of the second, fourth and fifth embodiments is employed as the basic structure.

Seventh Embodiment

Figure 13:
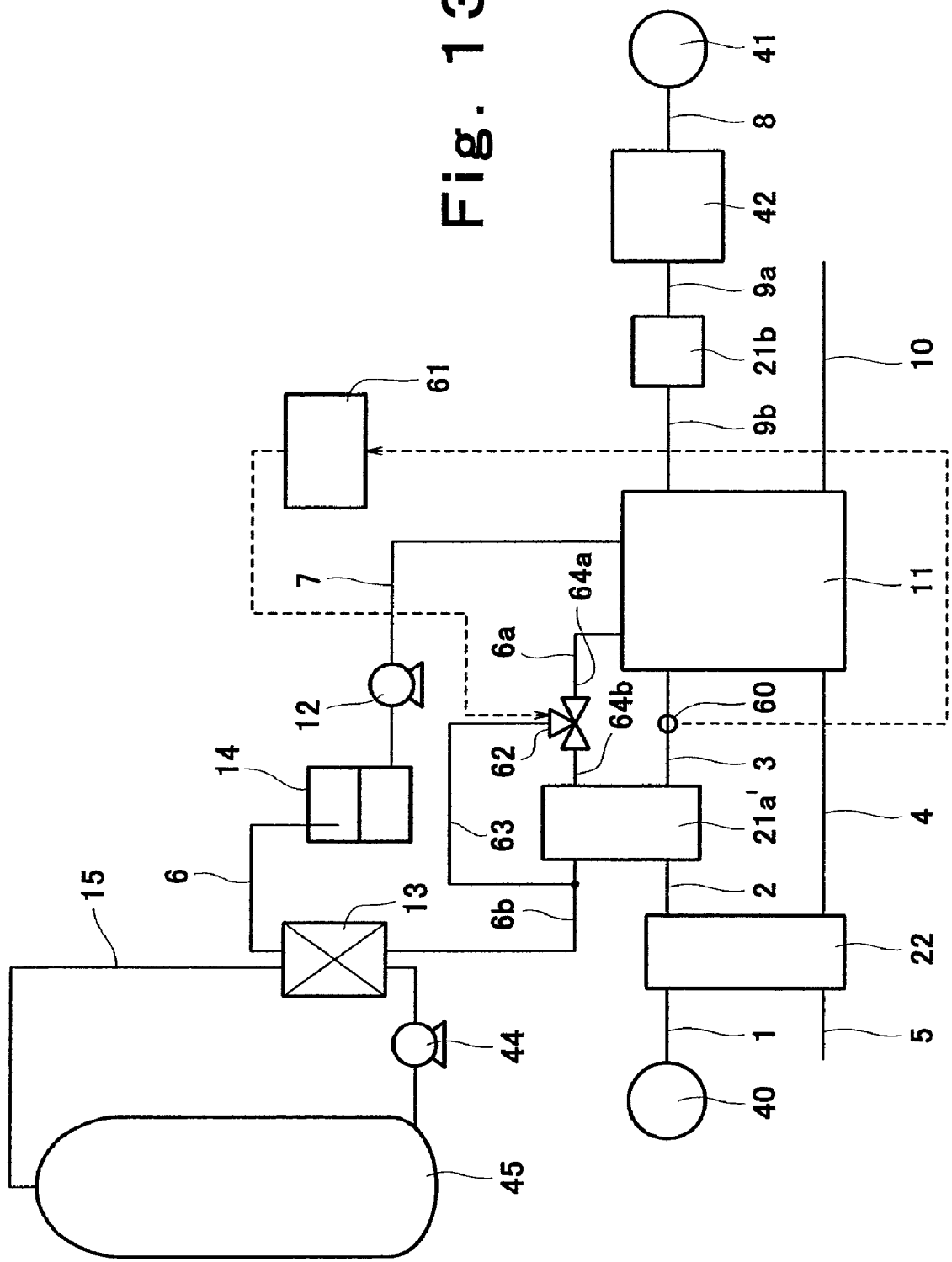
FIG. 13 illustrates a structure of a fuel cell system according to a seventh embodiment of the invention.

FIG. 13 diagrammatically shows a structure of a fuel cell system according to a seventh embodiment of the invention. The fuel cell system of the seventh embodiment has the same structure as the fuel cell system of the sixth embodiment except the following point. Specifically, in the fuel cell system of the present embodiment, a bypass path 63 bypassing the humidifying unit 21a' to circulate the cooling water is connected to the cooling water path 6a and the cooling water flow path 6b, in juxtaposition with the humidifying unit 21a'. A three-way valve 62 is provided in the cooling water path 6a for supplying cooling water to the humidifying unit 21a'. The three-way valve 62 has three pipe connection openings. Connected to the first connection opening is a pipeline 64a constituting the cooling water path 6a. Connected to the second connection opening is a pipeline 64b constituting the cooling water path 6a. Connected to the third connection opening is a pipeline 63' constituting the bypass path 63. The three-way valve 62 is controlled by the control unit 61, and the distribution of the cooling water supplied from the pipeline 64a to the pipelines 63', 64b is automatically adjustable.

In the fuel cell system of the above structure, the humidity of the supply air to be supplied to the fuel cell 11 via the air path 3 is detected by the detector 60, and based on the information on the humidity, the control unit 61 controls the three-way valve 62. With this arrangement, the distribution of the flow rate of the cooling water supplied from the pipeline 64a to the pipelines 64b, 63' is adjusted.

If the humidity detected by the detector 60 is smaller than a specified value for instance, the control unit 61 controls the three-way valve 62 based on the humidity information in such a way that the flow rate of the cooling water to be supplied to the humidifying unit 21a' increases and the flow rate of the cooling water to be supplied to the bypass path 63 decreases. This causes the flow rate of the cooling water to be fed to the humidifying unit 21a' to increase and as a result, the amount of moisture shifted from the cooling water to the supply air in the humidifying unit 21a', that is, the degree of humidification is increased. Thus, the humidity of the supply air can be adjusted to an optimum value. On the other hand, if the humidity of the supply air is greater than the specified value, the control unit 61 controls the three-way valve 62 based on the humidity information in such a way that the flow rate of the cooling water to be supplied to the humidifying unit 21a' decreases and the flow rate of the cooling water to be supplied to the bypass path 63 increases. This causes the flow rate of the cooling water to be fed to the humidifying unit 21a' to decrease, and as a result, the amount of moisture to be shifted from the cooling water to the supply air in the humidifying unit 21a', that is, the degree of humidification is reduced. Thus, the humidity of the supply air can be adjusted to an optimum value.

As described above, in the fuel cell system of the present embodiment, the humidity of the supply air can be optimized by controlling the flow rate of the cooling water to be supplied to the humidifying unit 21a', according to the humidity of the supply air. Accordingly, the same effect as in the sixth embodiment can be achieved. Further, in the system of the present embodiment, since the humidifying unit 21a' can be bypassed for circulation of the cooling water, the flow rate of the cooling water to be supplied to the fuel cell 11 and the flow rate of the cooling water to be supplied to the humidifying unit 21a' are independently adjustable. Thanks to this arrangement, the cooling water can be supplied to the humidifying unit 21a' in an optimum amount for the humidification of the supply air, while excessive cooling water can be circulated by way of the bypass path 63 without passing through the humidifying unit 21a'. As a result, the waste of moisture and heat energy of the cooling water in the humidifying portion 21a' can be restrained and the consumption of the moisture and heat energy of the cooling water can be reduced. Thus, optimally humidified supply air can be effectively obtained and the intrinsic function of the cooling water, that is, cooling of the fuel cell 11 can be effectively and stably carried out, thereby optimizing the operation temperature of the fuel cell 11. Furthermore, heat can be effectively transferred from the cooling water to the stored hot water. Consequently, both the stability and heat efficiency of the fuel cell system can be further improved.

While the above discussion has been presented in terms of a case where the flow rate of the cooling water to be supplied to the pipelines 64b, 63 is adjusted by the three-way valve 62, it is possible to appropriately provide the respective pipelines of the bypass path 63, cooling water path 6a and cooling water path 6b with a proportional valve, instead of the provision of the three-way valve.

Figure 14:
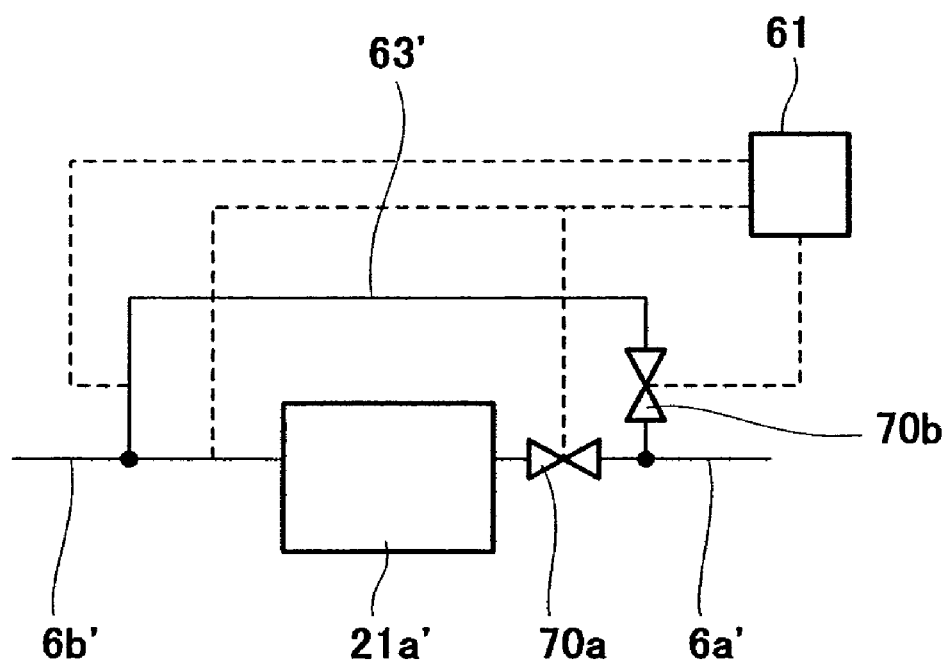
FIG. 14 diagrammatically illustrates a structure of a fuel cell system according to a modification of the seventh embodiment of the invention.

FIG. 14 diagrammatically shows part of the structure of a fuel cell system according a modification of the present embodiment. Herein, the humidifying unit 21a and its periphery are shown. As seen from FIG. 14, in this case, the pipeline 63' constituting the bypass path 63 is connected to a pipeline 6a' constituting the cooling water path 6a and to a pipeline 6b' constituting the cooling water flow path 6b. The pipeline 6a' has a proportional valve 70a which is located in the downstream of the connecting point of the pipeline 63'. The pipeline 63' has, a proportional valve 70b, which is located at the end of the connecting point of the pipeline 6a. The opening and closing of the proportional valves 70a and 70b is automatically controllable by the control unit 61. If the humidity of the supply air detected by the detector 60 is smaller than a specified value for instance, the control unit 61 controls the proportional valve 70a such that the flow rate of the cooling water to be supplied to the humidifying unit 21a' increases and controls the proportional valve 70b such that the flow rate of the cooling water to be supplied to the bypass path 63 decreases. On the other hand, if the humidity of the supply air is greater than the specified value, the control unit 61 controls the proportional valve 70a such that the flow rate of the cooling water to be supplied to the humidifying unit 21a' decreases and controls the proportional valve 70b such that the flow rate of the cooling water to be supplied to the bypass path 63 increases. With this arrangement, the same effect as in the sixth embodiment can be achieved.

While the above discussion has been presented in terms of a case where the basic structure of the fuel cell system is the same as that of the third embodiment, the present embodiment in which the flow rate of the cooling water to be supplied to the humidifying unit 21a and to the bypass path 63 is adjusted in accordance with the humidity of the supply air is also applicable to the structures of the fuel cell systems of the second, fourth and fifth embodiments.

Eighth Embodiment

Figure 15:
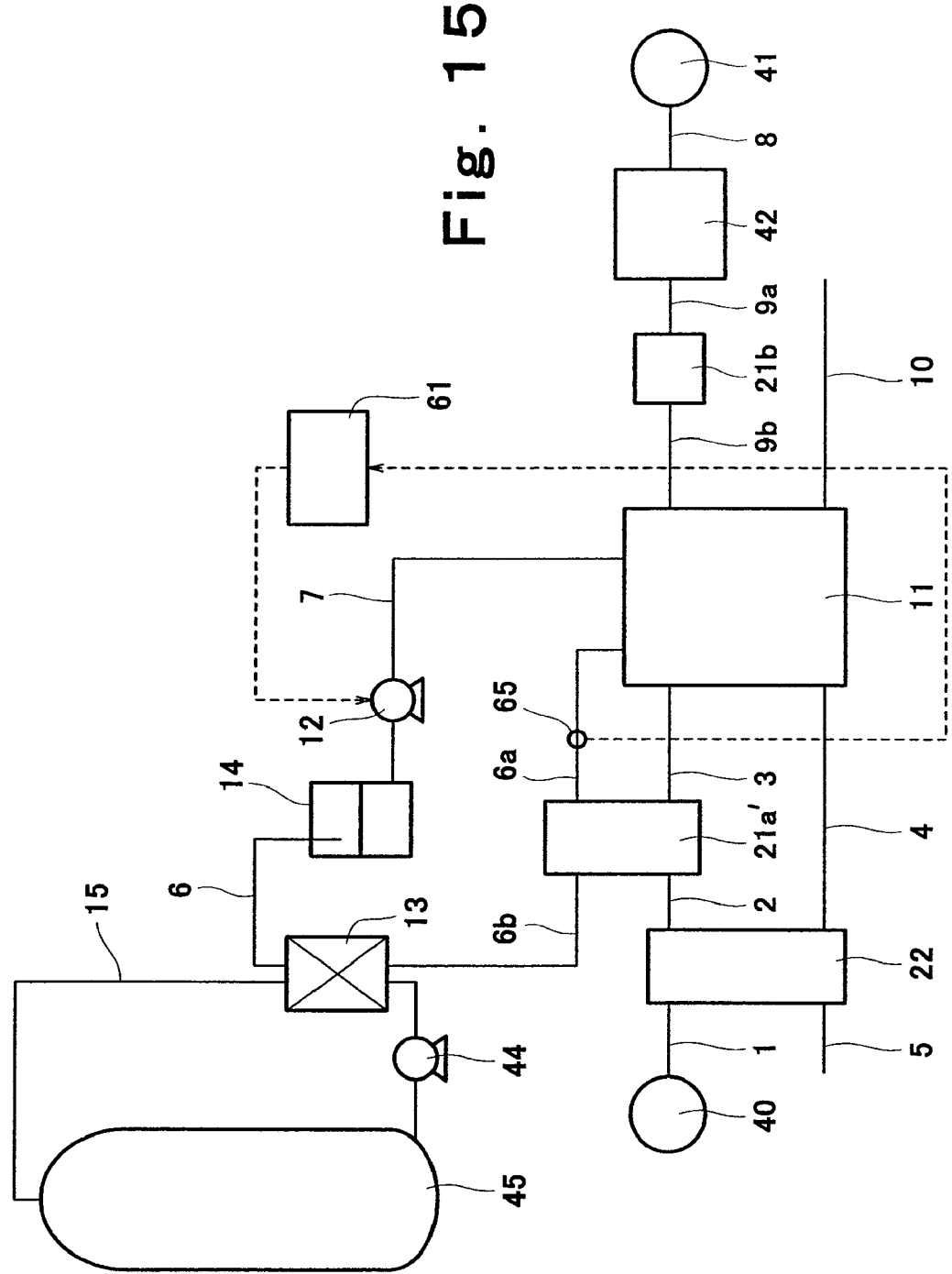
FIG. 15 diagrammatically illustrates a structure of a fuel cell system according to an eighth embodiment of the invention.

FIG. 15 diagrammatically illustrates a structure of a fuel cell system according to an eighth embodiment of the invention. As shown in FIG. 15, the fuel cell system of the eighth embodiment has the same structure as in the sixth embodiment, except that a detector 65 for detecting the temperature of the cooling water to be supplied to the humidifying unit 21a' is provided instead of the detector 60 for detecting the humidity of the supply air. The point of difference will be described below.

As described in the sixth embodiment, the temperature of the cooling water concerns the humidity of the supply air. In view of this, the fuel cell system of the present embodiment is designed such that the detector 65 detects the temperature of the cooling water to be supplied to the humidifying unit 21a' and according to the temperature information, the control unit 61 controls the flow rate of the cooling water to be supplied to the humidifying unit 21a'. As the detector 65, an electric-resistance type temperature sensor, contact type temperature sensor or the like may be used. The detector 65 is disposed just in front of the humidifying unit 21a' in the cooling water path 6a. If the temperature of the cooling water detected by the detector 65 is lower than a specified value, it is understood that moisture is shifted from the cooling water to the supply air in a less amount compared to the case where the temperature of the cooling water is high. Therefore, there is a need to increase the flow rate of the cooling water in order to obtain the optimum humidity for the supply air. In this case, the control unit 61 increases the output of the cooling water pump 12 or the revolution speed of the pump 12 based on the information on the temperature of the cooling water. This causes the flow rate of the cooling water to be supplied to the humidifying unit 21a' to increase and as a result, the amount of moisture shifted from the cooling water to the supply air in the humidifying unit 21a', that is, the degree of humidification increases. Therefore, the humidity of the supply air can be optimized. On the other hand, if the temperature of the cooling water is higher than a specified value, it is understood that moisture is shifted from the cooling water to the supply air in a larger amount and therefore the optimum humidity can be obtained by a lower cooling water flow rate, compared to the case where the temperature of the cooling water is low. In this case, the control unit 61 reduces the output of the cooling water pump 12 or the revolution speed of the pump 12 based on the information on the temperature of the cooling water. This causes the flow rate of the cooling water to be supplied to the humidifying unit 21a' to decrease and as a result, the amount of moisture shifted from the cooling water to the supply air in the humidifying unit 21a', that is, the degree of humidification decreases. Therefore, the humidity of the supply air can be optimized.

In the present embodiment, since the flow rate of cooling water to be supplied is controlled depending on the temperature of the cooling water as discussed above, the same effect as in the sixth embodiment can be achieved.

Although the above discussion has been presented in terms of a case where the flow rate of the cooling water to be supplied is adjusted by controlling the cooling water pump 12, the adjusting method for the flow rate of the cooling water is not limited to this. For instance, the cooling water path 6a may be provided with a proportional valve which is used for the adjustment of the flow rate of the cooling water, as discussed in the sixth embodiment. As discussed in the sixth embodiment, the humidity of the supply air may be controlled by controlling the temperature of the cooling water instead of the flow rate of the cooling water. Additionally, the above discussion is associated with a case where the basic structure of the fuel cell system is the same as that of the third embodiment, but the basic structure of the systems of the present embodiment may be the same as the structure of the system of any of the second, fourth and fifth embodiments. Further, the present embodiment may be applied to the structure of the fuel cell system of the seventh embodiment, that is, the bypass path 63 for bypassing the humidifying unit 21a' may be employed in the present embodiment.

Ninth Embodiment

Figure 16:
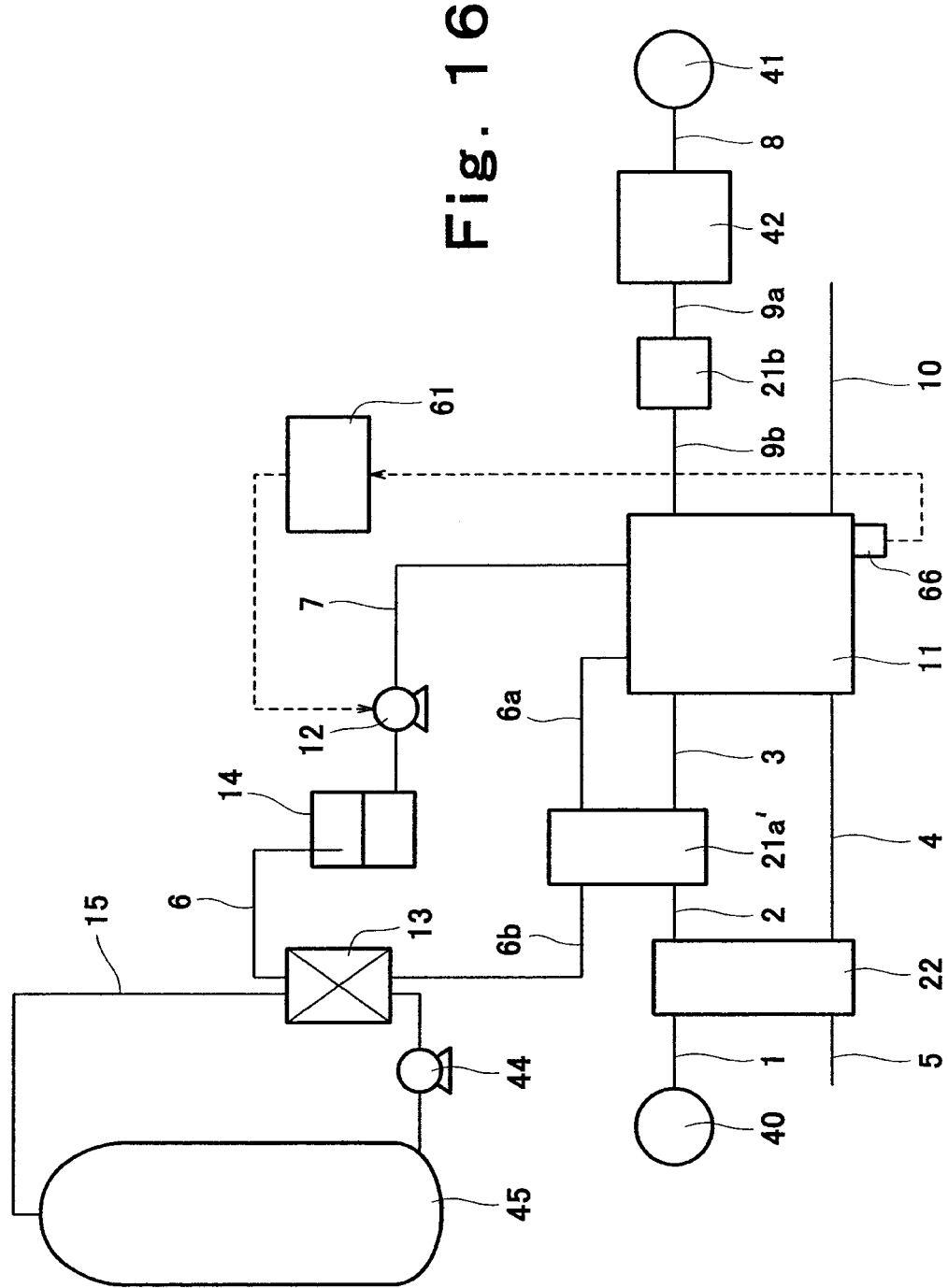
FIG. 16 diagrammatically illustrates a structure of a fuel cell system according to a ninth embodiment of the invention.

FIG. 16 diagrammatically illustrates a structure of a fuel cell system according to a ninth embodiment of the invention. As shown in FIG. 16, the fuel cell system of the ninth embodiment has the same structure as in the sixth embodiment, except that a detector 66 for detecting the amount of electricity generated by the fuel cell 11 is provided instead of the detector 60 for detecting the humidity of the supply air. As the detector 66, a power meter may be used. Since the fuel cell system is usually operated while detecting the amount of generated electricity, it is not necessary to provide another power meter and the power meter originally provided for the system can be utilized as the detector 66. Hereinafter, the difference between the ninth and sixth embodiments will be described.

The amount of electricity generated by the fuel cell 11 corresponds to the amount of air to be supplied to the air pole side and the amount of fuel gas to be supplied to the fuel pole side. If a large amount of electricity is generated by the fuel cell 11, the flow rate of the air to be supplied to the fuel cell 11 becomes high. Therefore, the flow rate of the cooling water to be supplied to the humidifying unit 21a' needs to be increased in order to humidify the supply air. On the other hand, if a small amount of electricity is generated by the fuel cell 11, the flow rate of the air to be supplied to the fuel cell 11 becomes low, and therefore, the flow rate of the cooling water to be supplied to the humidifying unit 21a' for humidification of the supply air may be low. Thus, the humidity of the supply air can be optimized by adjusting the flow rate of the cooling water to be supplied to the humidifying unit 21a' according to the amount of electricity generated by the fuel cell 11.

If the amount of electricity generated by the fuel cell 11 which has been detected by the detector 66 is greater than a specified value, a large amount of air is supplied to the fuel cell 11, so that the amount of moisture shifted from the cooling water to the supply air (i.e., the degree of humidification) in the humidifying unit 21a' becomes large. In this case, the control unit 61 increases the output of the cooling water pump 12 or the revolution speed of the cooling water pump 12 based on the electricity amount information sent from the detector 66, thereby increasing the amount of cooling water to be supplied to the humidifying unit 21a'. With this arrangement, optimum humidification can be performed on the supply air having a high the flow rate. On the other hand, if the amount of electricity generated by the fuel cell 11 is small, the amount of air to be supplied to the fuel cell 11 is small, and therefore the amount of moisture shifted from the cooling water to the supply air (i.e., the degree of humidification) within the humidifying unit 21a' may be small. In this case, the control unit 61 reduces the output of the cooling water pump 12 or the revolution speed of the cooling water pump 12 based on the electricity amount information sent from the detector 66, thereby reducing the amount of cooling water to be supplied to the humidifying unit 21a'. Thanks to this arrangement, optimum humidification can be performed on the supply air.

In the present embodiment, since the flow rate of cooling water to be supplied to the humidifying unit 21a' is controlled depending on the amount of electricity generated by the fuel cell 11, air humidified to an optimum degree can be stably supplied in accordance with the operating state of the fuel cell 11. Accordingly, the same effect as in the sixth embodiment can be obtained. Since the power meter originally provided for the system can be as the detector 66 as discussed earlier, there is no need to provide another detector for controlling the degree of humidification so that simplification of the system and cost reduction can be achieved.

Although the above discussion has been presented with a case where the flow rate of the cooling water to be supplied is adjusted by controlling the cooling water pump 12, the adjusting method for the flow rate of the cooling water is not limited to this. For instance, the cooling water path 6a may be provided with a proportional valve which is used for the adjustment, as described in the third embodiment. As discussed in the sixth embodiment, the humidity of the supply air may be controlled by controlling the temperature of the cooling water instead of the flow rate of the cooling water.

While the humidity of the supply air is controlled according to the amount of electricity generated by the fuel cell 11 in the above discussion, it is readily apparent that the flow rate of the supply air to be supplied to the fuel cell 11 may be directly detected and the humidity of the supply air may be controlled according the flow rate of the supply air. For example, a detector for detecting the flow rate of the supply air is disposed just in front of the fuel cell 11 in the air path 3, and if the flow rate of the supply air detected by the detector is high, the transfer of moisture to the air is promoted as described earlier, thereby increasing humidity. On the other hand, if the flow rate of the supply air detected by the detector is low, the transfer of moisture to the air is restricted as described earlier, thereby reducing humidity. With this arrangement, the same effect as in the foregoing discussion can be attained.

Additionally, the above discussion is associated with a case where the basic structure of the fuel cell system is the same as that of the third embodiment, but the basic structure of the fuel cell system of the present embodiment may be the same as the structure of the fuel cell system of any of the second, fourth and fifth embodiments. The present embodiment may be applied to the structure of the fuel cell system of the seventh embodiment, that is, the bypass path 63 for bypassing the humidifying unit 21a' may be employed in the present embodiment.

Although the above discussion has been presented with a case where the pre-humidifying unit 22/the pre-humidifying portion 22' and the humidifying unit 21a'/the humidifying portion 21' have a structure formed by lamination of a plurality of flow path plates 27, 27' with a moisture transmitting film 23 between every two plates (i.e., the so-called plate-like structure, the structure of these members is not limited to the plate-like structure. For example, the pre-humidifying unit 22, the pre-humidifying portion 22', the humidifying unit 21a' and the humidifying portion 21' may have a tube-like structure. The pre-humidifying unit of a tube-like structure will be exemplified below.

Figure 17:
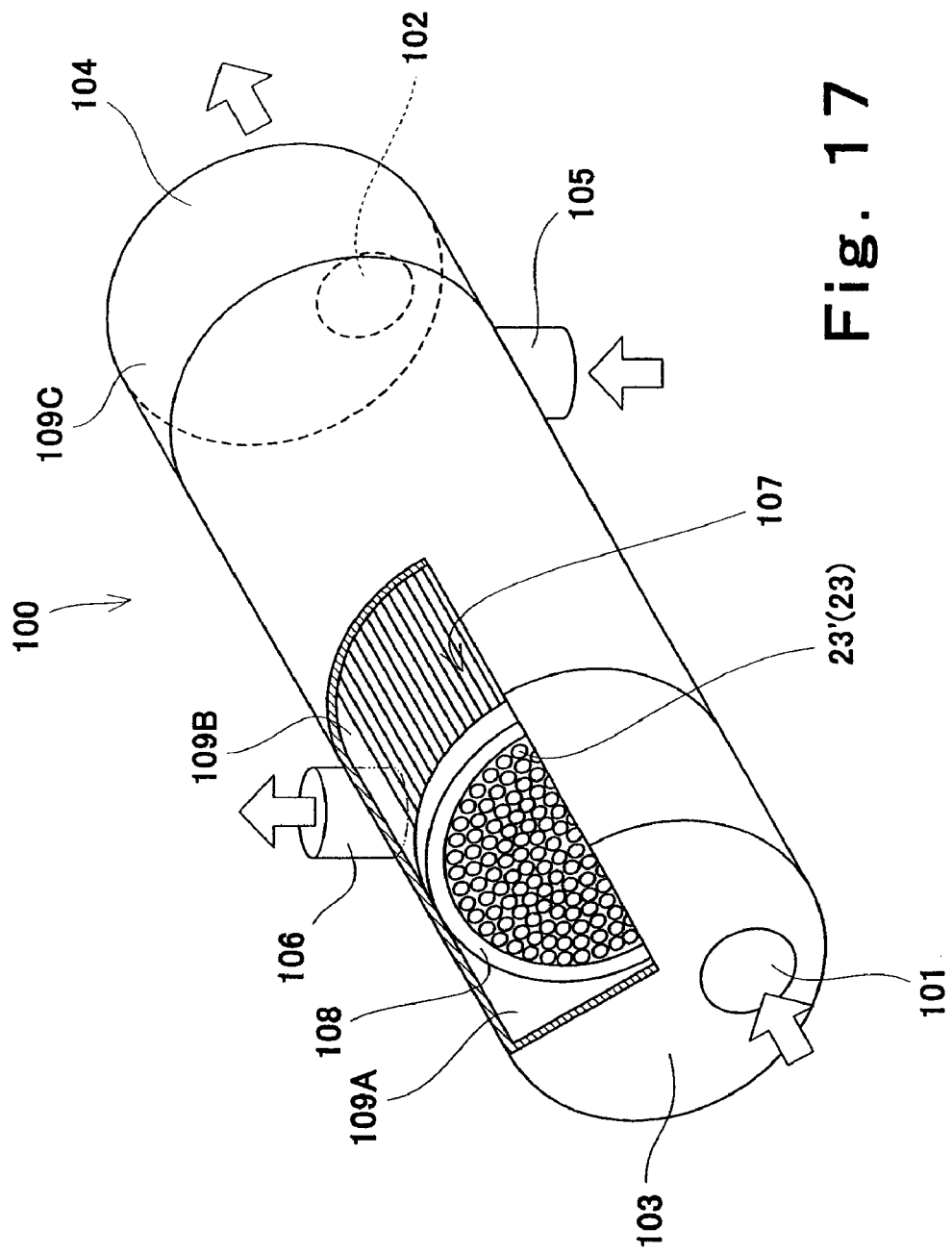
FIG. 17 shows another structure of the pre-humidifying unit.

FIG. 17 is a diagrammatical cut-away perspective view showing the structure of the pre-humidifying unit 22 having a tube-like structure. As shown in FIG. 17, the pre-humidifying unit 22 comprises a cylindrical main body 100 having, at its circumferential surface, a supply air inlet 105 and a supply air outlet 106, and at both ends of which is sealed by circular plates 103, 104 having an exhaust air inlet 101 and an exhaust air outlet 102. Within the cylindrical main body 100, a moisture transmitting module 107 is accommodated so as to have the same axial direction as that of the main body 100, the module 107 being composed of a plurality of hollow string-like fibers 23' tied in a bundle which are composed of moisture transmitting films 23. The exhaust air path 4 (not shown) is connected to the exhaust air inlet 101 of the main body 100; the exhaust air path 5 (not shown) is connected to the exhaust air outlet 102; the supply air path 1 (not shown) is connected to the supply air inlet 105; and the supply air path 2 (not shown) is connected to the supply air outlet 106. A sealing member 108 is attached to both ends of the moisture transmitting film module 107, whereby the inside of the main body 100 is divided into (a) a first space 109A communicating with the exhaust air path 4 by way of the exhaust air inlet 101; (b) a second space 109B being formed in the periphery of the moisture transmitting module 107 and communicating with the supply air paths 1, 2 by way of the supply air inlet 105 and the supply air outlet 106 respectively; and (c) a third space 109C communicating with the exhaust air path 5 by way of the exhaust air outlet 102.

In the pre-humidifying unit 22 having such a structure, the supply air is fed to the second space 109B of the main body 100 through the supply air inlet 105, whereas the supply air being withdrawn from the space 109B through the supply air outlet 106. This forms a flow of supply air in the periphery of the moisture transmitting film module 107 and in the periphery of each hollow string-like fiber 23' of the moisture transmitting film module 107. On the other hand, the exhaust air which has been fed to the first space 109A of the main body 100 through the exhaust air inlet 101 goes into the moisture transmitting film module 107 from one end surface thereof. The exhaust air flows in the axial direction of the hollow string-like fibers 23' constituting the moisture transmitting film module 107 within each of them. Thereafter, the exhaust air is released from the other end of the module to the third space 109C and taken out of the exhaust air outlet 102. With this arrangement, a flow of exhaust air from the first space 109A to the third space 109C is formed.

Within the second space 109B of the main body 100, the supply air flow path formed in the respective peripheries of the moisture transmitting film module 107 and the hollow string-like fibers 23' constituting the film module 107 contacts the exhaust air flow path formed within the hollow string-like fibers 23' of the film module 107, through a moisture transmitting film 23. Therefore, moisture and heat energy are shifted from the exhaust air to the supply air through a moisture transmitting film 23, similarly to the case of the plate-like structure described earlier. Thus, the supply air heated and humidified by the exhaust air can be withdrawn from the main body 100. Accordingly, the fuel cell system having the pre-humidifying unit 22 of the tube-like structure provides the same effect as described above. Although the tube-like structure has been explained with the pre-humidifying unit 22, it should be noted that the tube-like structure shown in FIG. 17 is applicable to the pre-humidifying portion 22', the humidifying unit 21a' and the humidifying portion 21'.

The present invention is implemented in the forms discussed above and has the following effects. The fuel cell system of the invention is capable of providing improved energy efficiency while performing stable system operation. In addition, compact and simplified system configuration is possible.

As these embodiments may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of operating a fuel cell system, the method comprising the steps:
    (a) generating electricity by a fuel cell using fuel gas and oxidizing gas;
    (b) allowing cooling water to flow in the fuel cell and thereby cooling the fuel cell in step (a);
    (c) transferring moisture from exhaust gas to supply gas using a first humidifier, the exhaust gas being discharged from the fuel cell, the supply gas being supplied to the fuel cell;
    (d) transferring moisture from the cooling water to the supply gas humidified with step (c) using a second humidifier;
    (e) at least one of the steps of detecting humidity of the supply gas humidified with step (d), wherein at least one step comprises detecting temperature of the cooling water, detecting the flow rate of the supply gas and detecting the amount of electricity generated by the fuel cell; and
    (f) controlling the humidity of the supply gas humidified with step (d) based on a value detected by step (e).

2. The method according to claim 1, wherein the humidity of the supply gas is controlled by controlling the temperature of the cooling water or the flow rate of the cooling water.

3. The method according to claim 1, wherein the humidity of the supply gas is controlled by controlling the flow rate of the cooling water to be supplied to the second humidifier through a cooling water path and the flow rate of the cooling water to be supplied to a cooling water bypass path.

4. The method according to claim 1,
    wherein the first humidifier is adjacent to and integral with the second humidifier, the first and second humidifiers forming a humidifying unit, wherein the humidifying unit is formed by laminating a plurality of flow path plates with at least one moisture transmitting film for selectivity transmitting moisture, the film being situated between adjoining flow path plates;
    each flow path plate having, on a first main surface, a flow path for the exhaust gas in a region of the first humidifier and a flow path for the cooling water in a region of the second humidifier and having, on a second main surface, a flow path for the supply gas which continuously extends throughout the first and second humidifiers.

5. The method according to claim 1,
    wherein the first humidifier is adjacent to and integral with the second humidifier, the first and second humidifiers forming a humidifying unit, wherein the first humidifier of the humidifying unit is formed by laminating a plurality of first flow path plates with at least one moisture transmitting film for selectivity transmitting moisture, the film being situated between adjoining first flow path plates;
    each first flow path plate having a flow path for the exhaust gas on a first main surface and a flow path for the supply gas on a second main surface;
    wherein the second humidifier of the humidifying unit is formed by laminating a plurality of second flow path plates with at least one moisture transmitting film for selectivity transmitting moisture, the film being situated between adjoining second flow path plates;
    each second flow path plate having a flow path for the cooling water on a first main surface and a flow path for the supply gas on a second main surface; and wherein the first and second humidifiers are laminated to constitute the humidifying unit.

6. The method according to claim 1, wherein step (b) further comprises allowing cooling water from a cooling water tank to flow in the fuel cell and thereby cooling the fuel cell in step (a).

* * * * *

UNITED STATES PATENT AND TRADEMARK OFFICE
CERTIFICATE OF CORRECTION

| | |
|---|---|
| PATENT NO. | : 8,129,062 B2 |
| APPLICATION NO. | : 12/819519 |
| DATED | : March 6, 2012 |
| INVENTOR(S) | : Yoshikazu Tanaka et al. |

It is certified that error appears in the above-identified patent and that said Letters Patent is hereby corrected as shown below:

Column 25, line 47 (claim 1(e))

After "step (d)," the following words should be deleted:

"wherein at least one step comprises"

Signed and Sealed this
Seventh Day of August, 2012

David J. Kappos
*Director of the United States Patent and Trademark Office*